US009606337B2

(12) United States Patent
Ikeda et al.

(10) Patent No.: US 9,606,337 B2
(45) Date of Patent: Mar. 28, 2017

(54) ZOOM LENS AND IMAGING APPARATUS

(71) Applicant: FUJIFILM Corporation, Tokyo (JP)

(72) Inventors: Shinkichi Ikeda, Saitama-ken (JP);
Yasutaka Shimada, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 102 days.

(21) Appl. No.: 14/730,442

(22) Filed: Jun. 4, 2015

(65) Prior Publication Data

US 2015/0355440 A1   Dec. 10, 2015

(30) Foreign Application Priority Data

Jun. 6, 2014 (JP) .................................. 2014-117374
Mar. 6, 2015 (JP) .................................. 2015-045036

(51) Int. Cl.
G02B 15/14       (2006.01)
G02B 15/173      (2006.01)

(52) U.S. Cl.
CPC .................................. G02B 15/173 (2013.01)

(58) Field of Classification Search
CPC ...... G02B 15/14; G02B 15/16; G02B 15/161; G02B 15/167; G02B 15/20
USPC .................................................. 359/676–706
See application file for complete search history.

(56) References Cited

U.S. PATENT DOCUMENTS

| 5,561,560 A | 10/1996 | Tsutsumi |
| 2010/0085647 A1 | 4/2010 | Nurishi |
| 2011/0038055 A1 | 2/2011 | Nurishi |

FOREIGN PATENT DOCUMENTS

| JP | 07-248449 | 9/1995 |
| JP | 2009-128491 | 6/2009 |
| JP | 2010-091788 | 4/2010 |
| JP | 2011-039399 | 2/2011 |

*Primary Examiner* — Mahidere Sahle
(74) *Attorney, Agent, or Firm* — Young & Thompson

(57) ABSTRACT

A zoom lens consists of five lens groups including, in order from the object side, positive, negative, positive, positive, and positive lens groups. During magnification change, the first and fifth lens groups are fixed relative to the image plane, and the second, third, and fourth lens groups are moved to change distances therebetween. During magnification change from the wide-angle end to the telephoto end, the second lens group is moved from the object side toward the image plane side, and the fourth lens group is moved from the image plane side toward the object side. The fifth lens group includes at least two negative lenses, and satisfies the condition expression (1) below:

$$1.90 < LABnd \qquad (1).$$

12 Claims, 18 Drawing Sheets

FIG.1
EXAMPLE 1
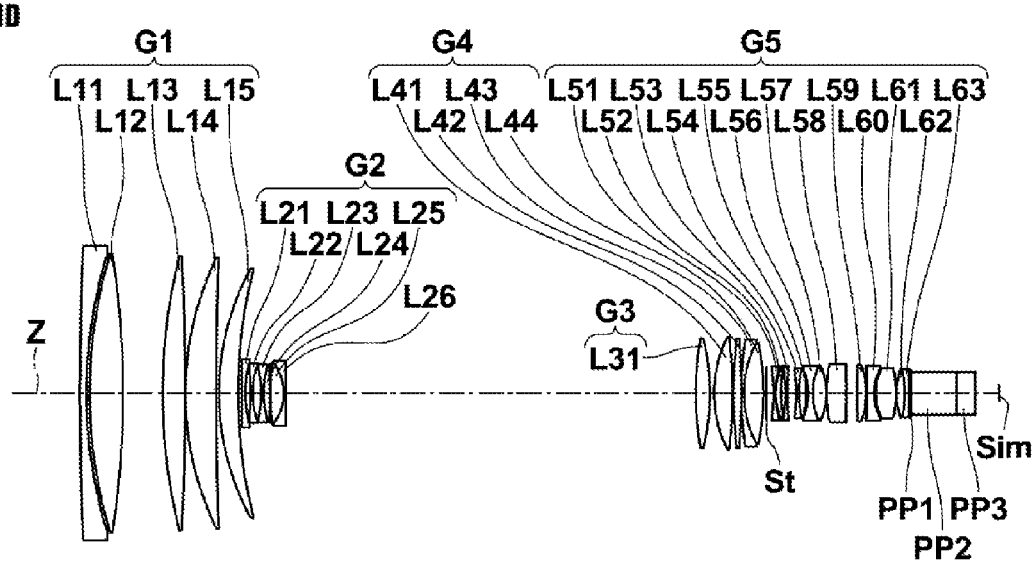
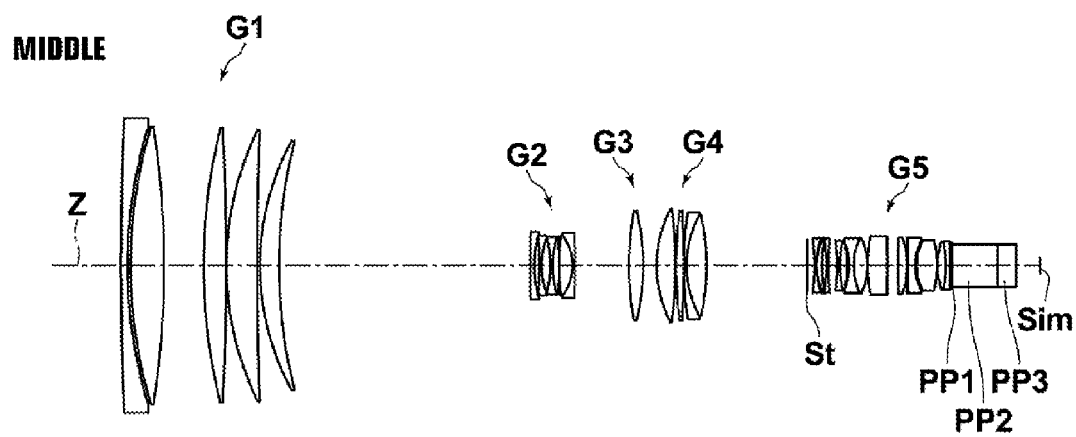
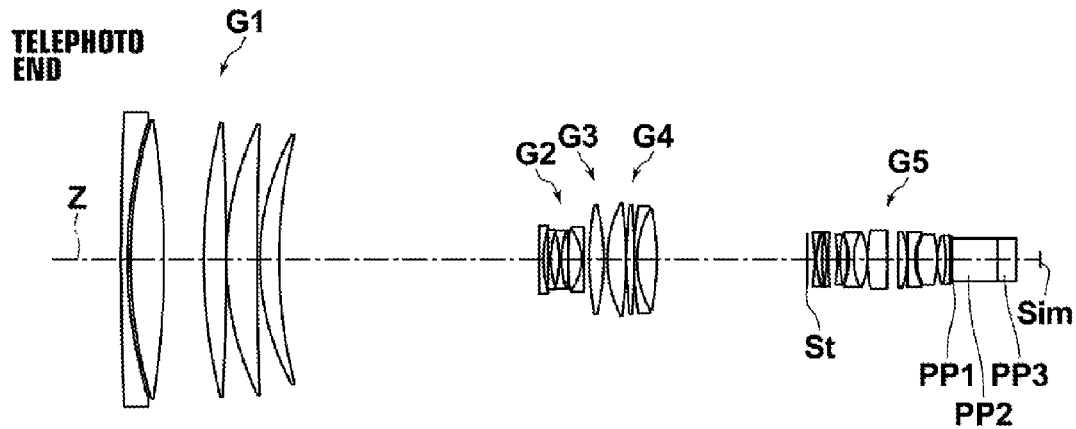

FIG.2
EXAMPLE 1
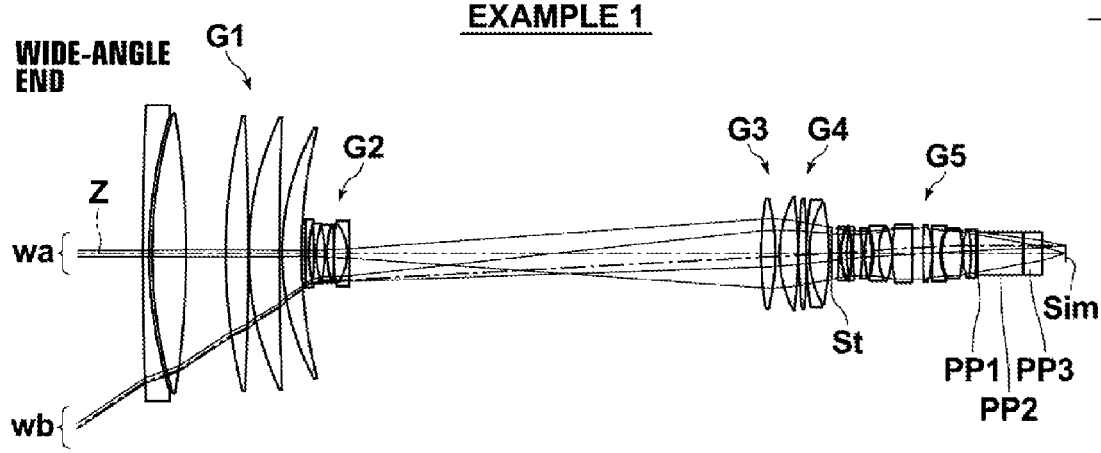
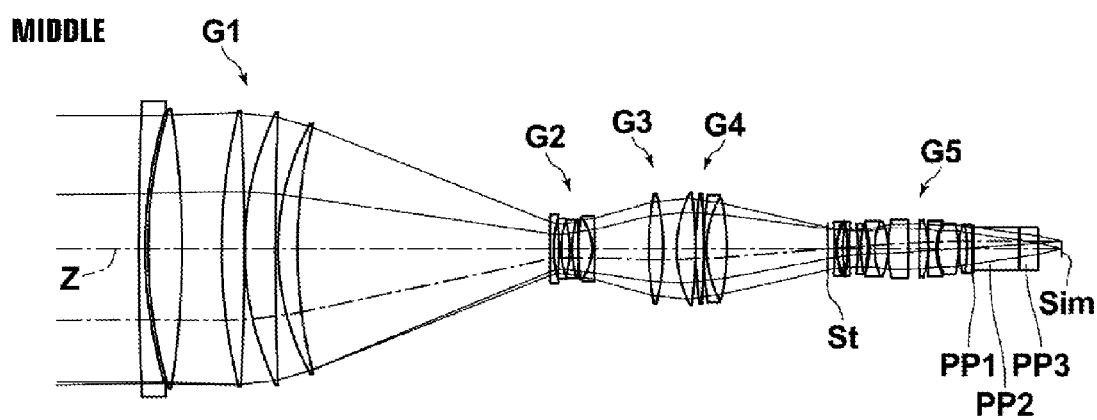
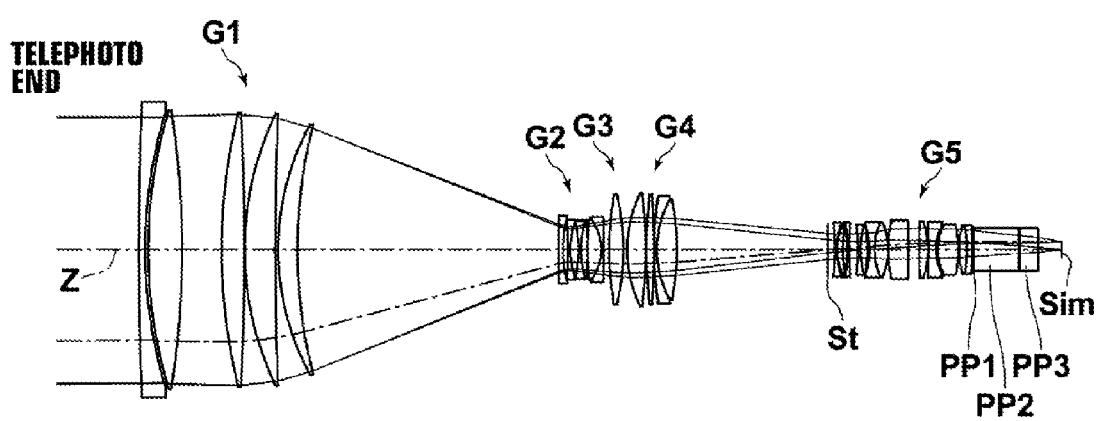

FIG.3
EXAMPLE 2
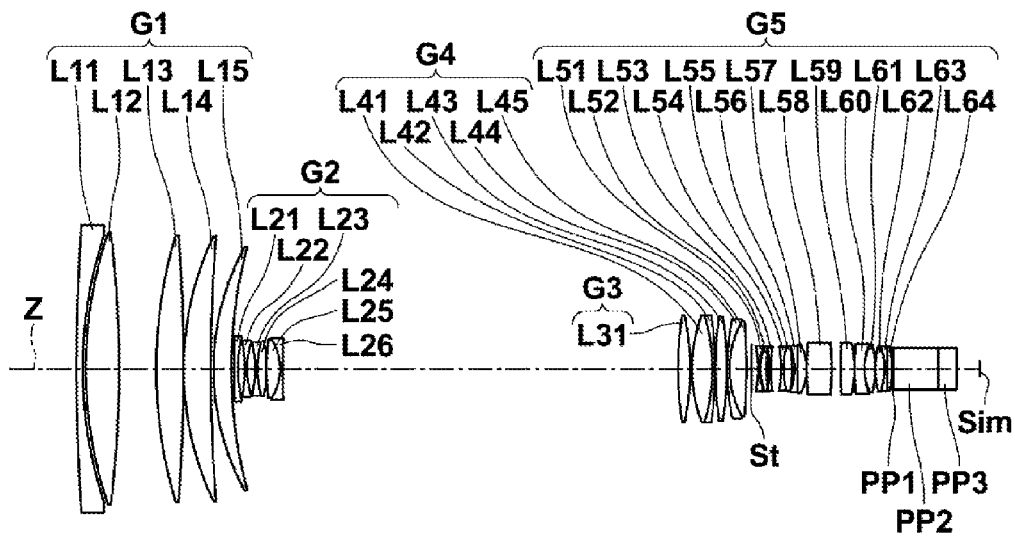
WIDE-ANGLE END
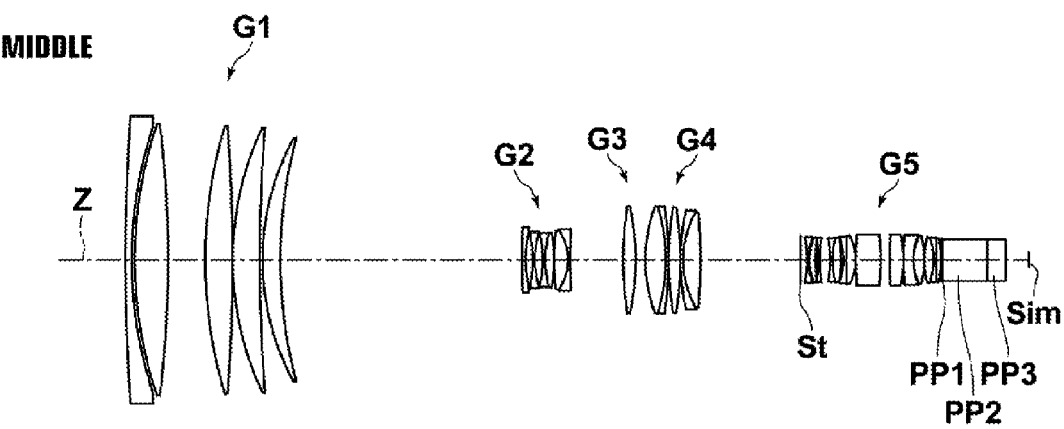
MIDDLE
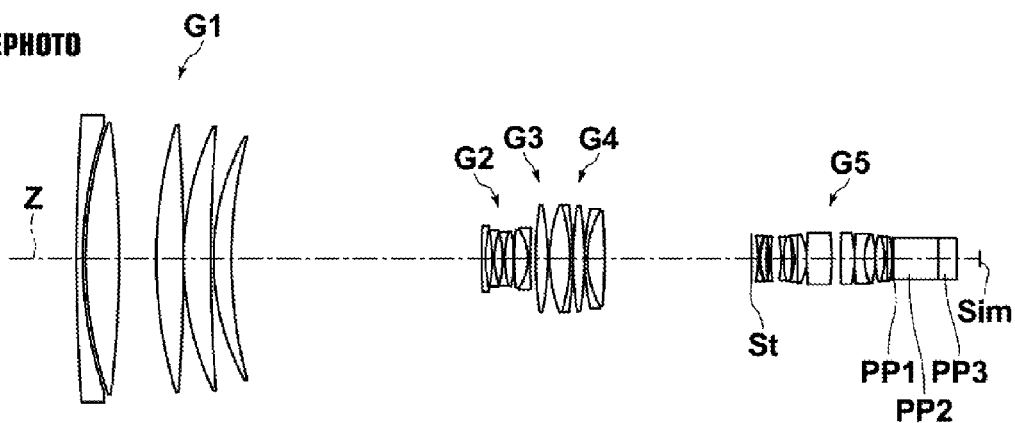
TELEPHOTO END

FIG.4
EXAMPLE 3
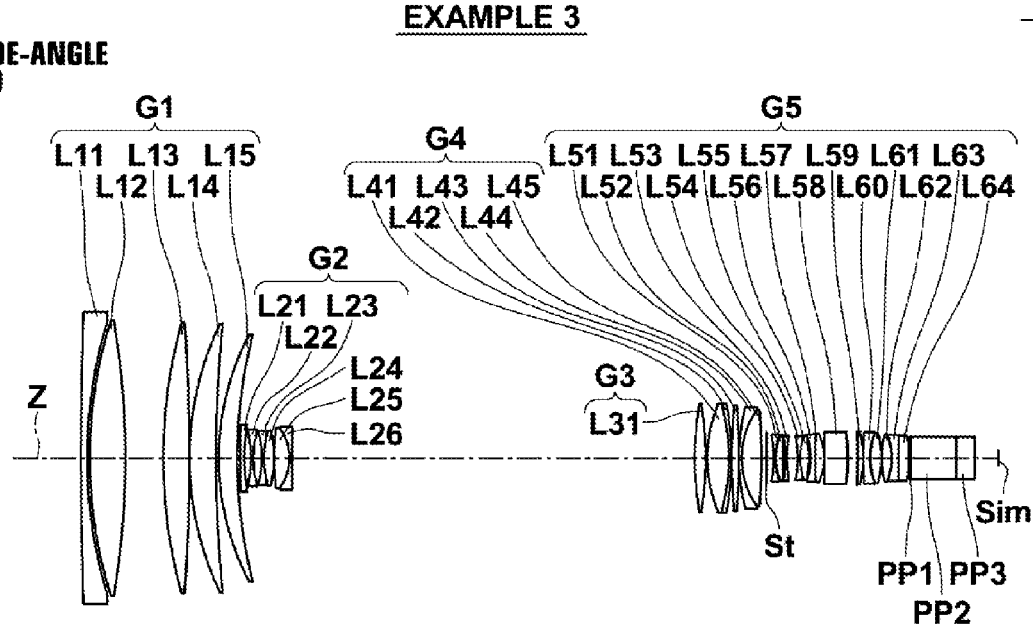
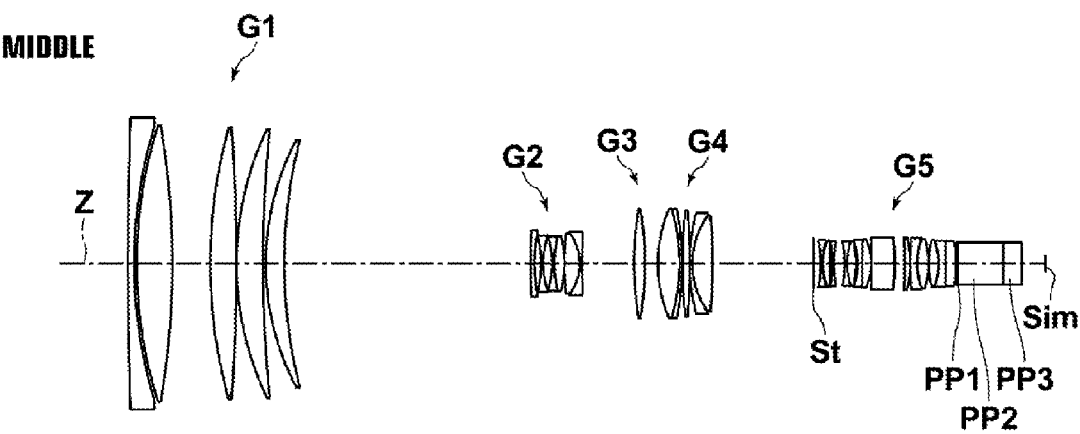
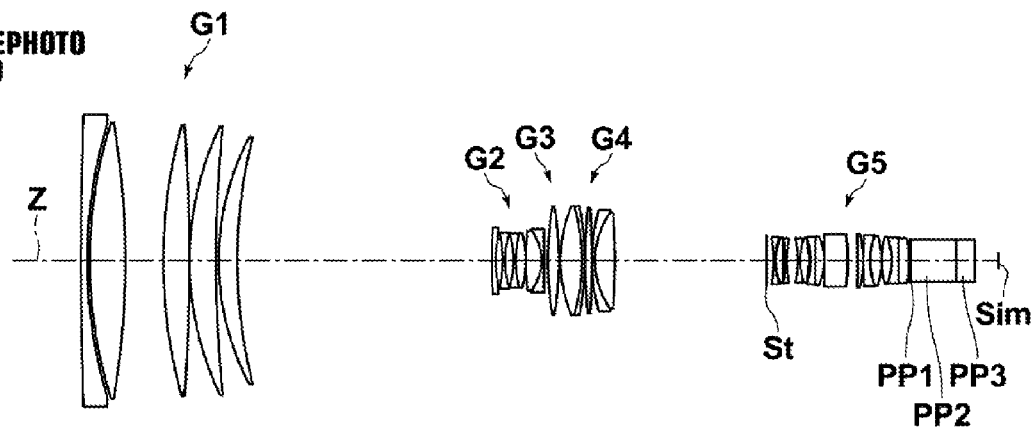

FIG.5
EXAMPLE 4
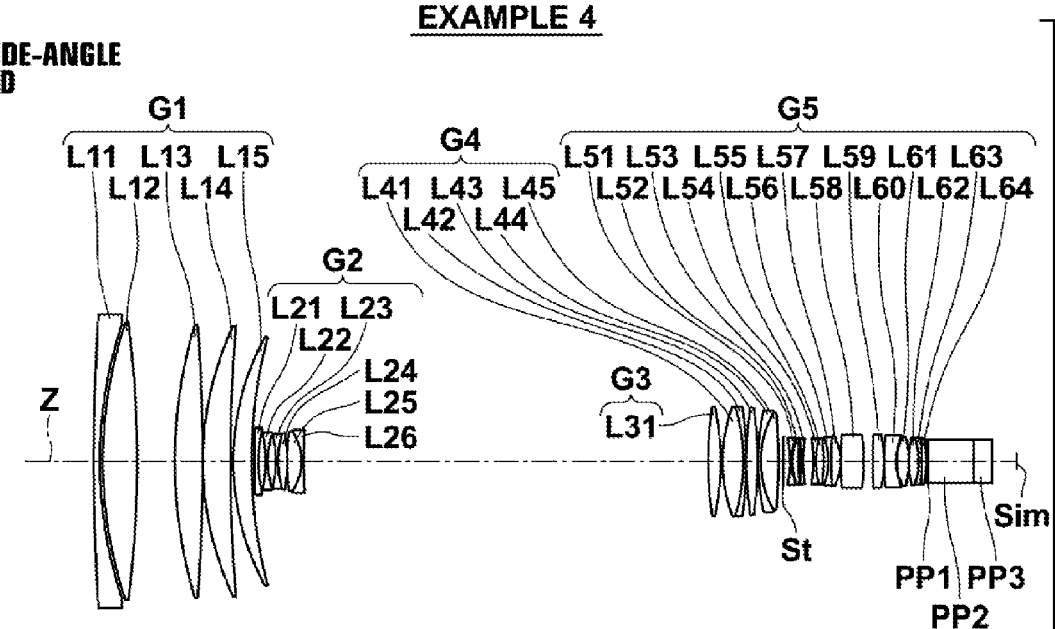
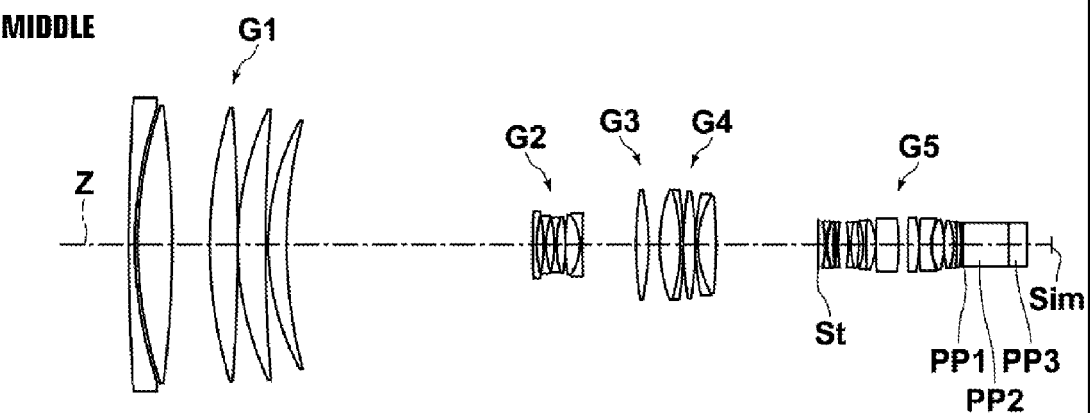
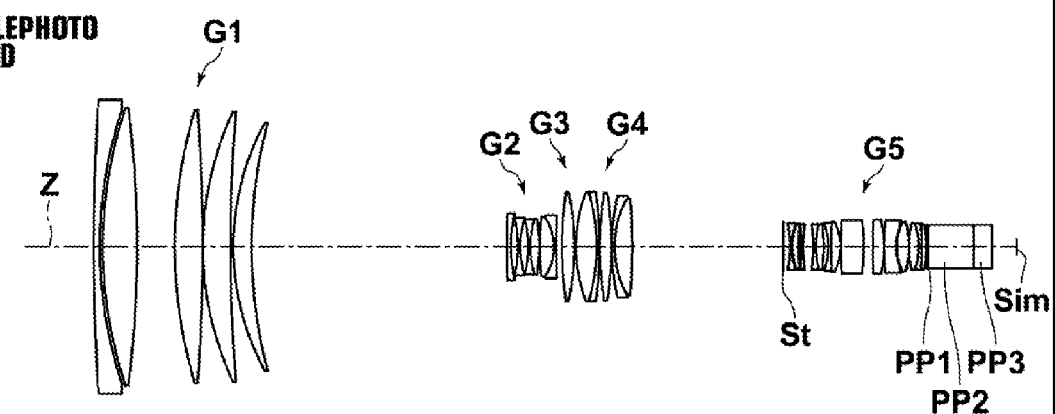

FIG.6
EXAMPLE 5
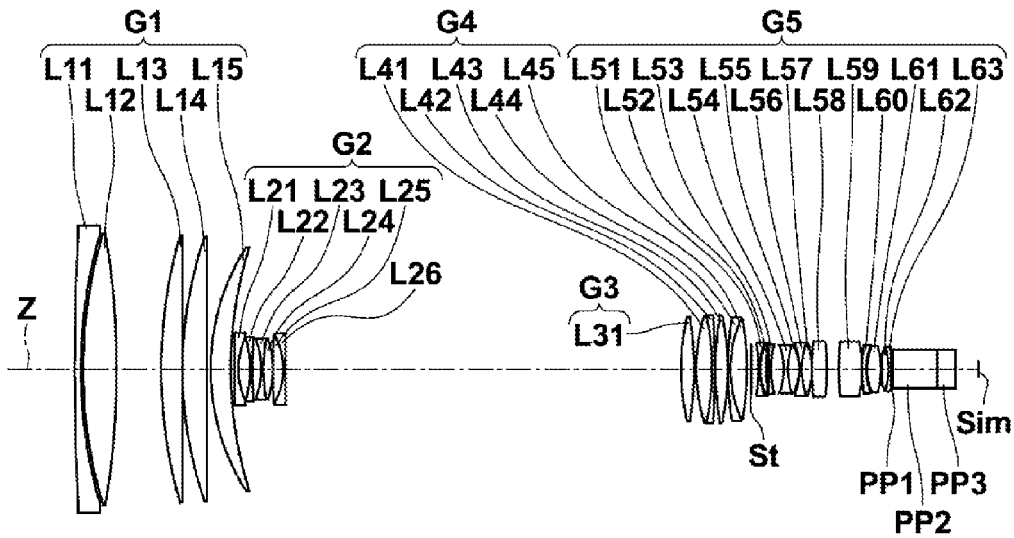
WIDE-ANGLE END
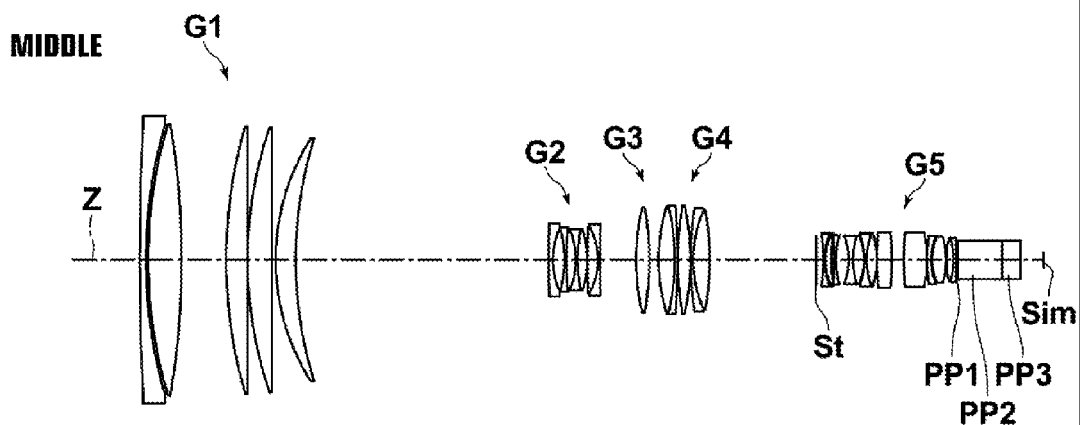
MIDDLE
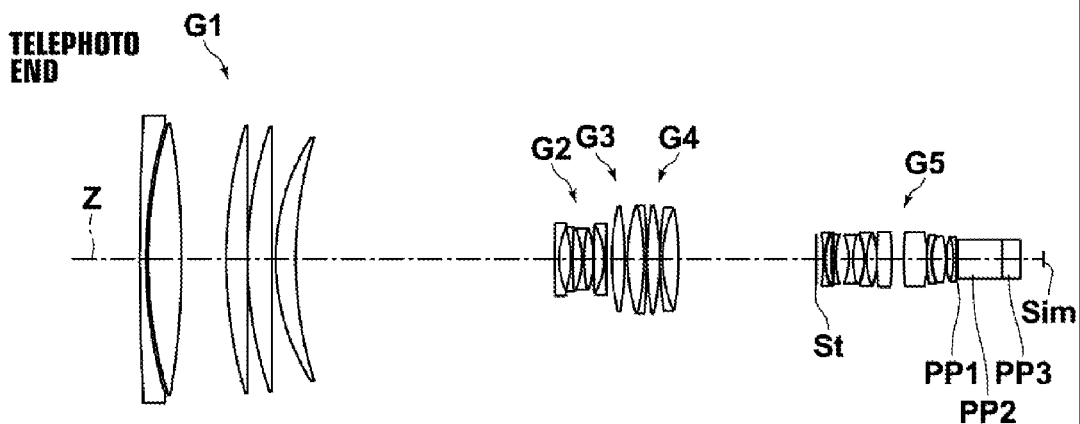
TELEPHOTO END

FIG.7
EXAMPLE 6
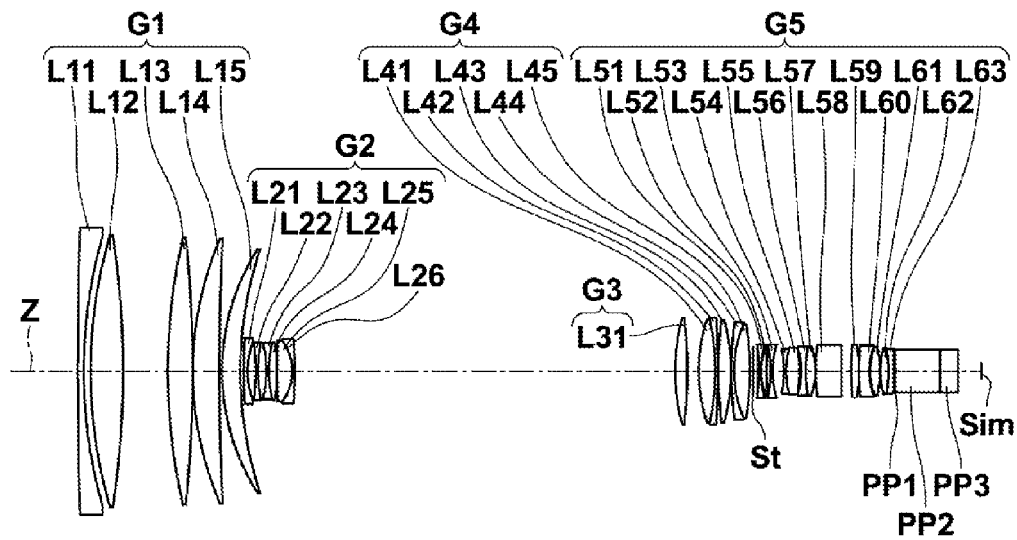
WIDE-ANGLE END
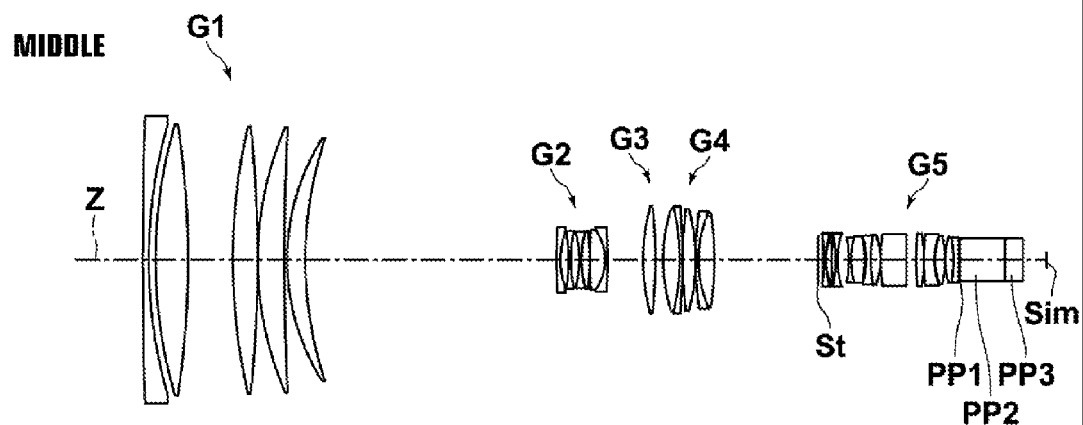
MIDDLE
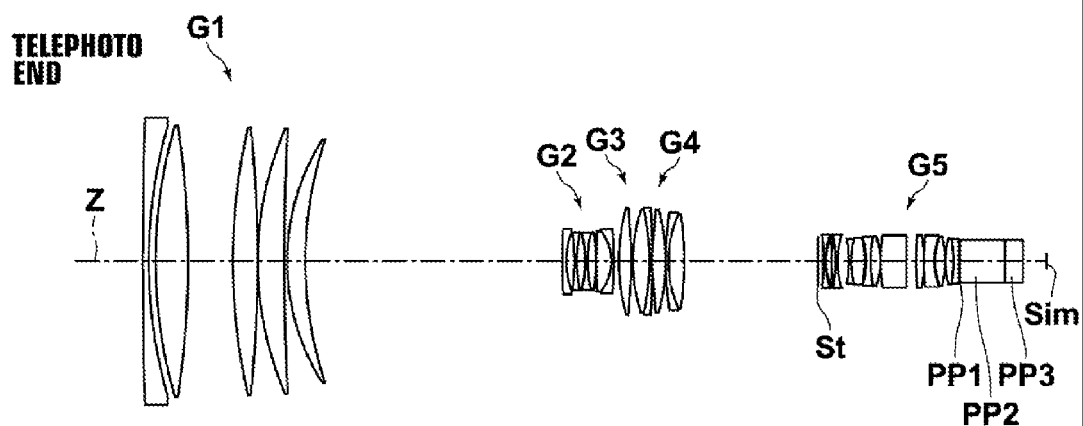
TELEPHOTO END

FIG.8
EXAMPLE 7
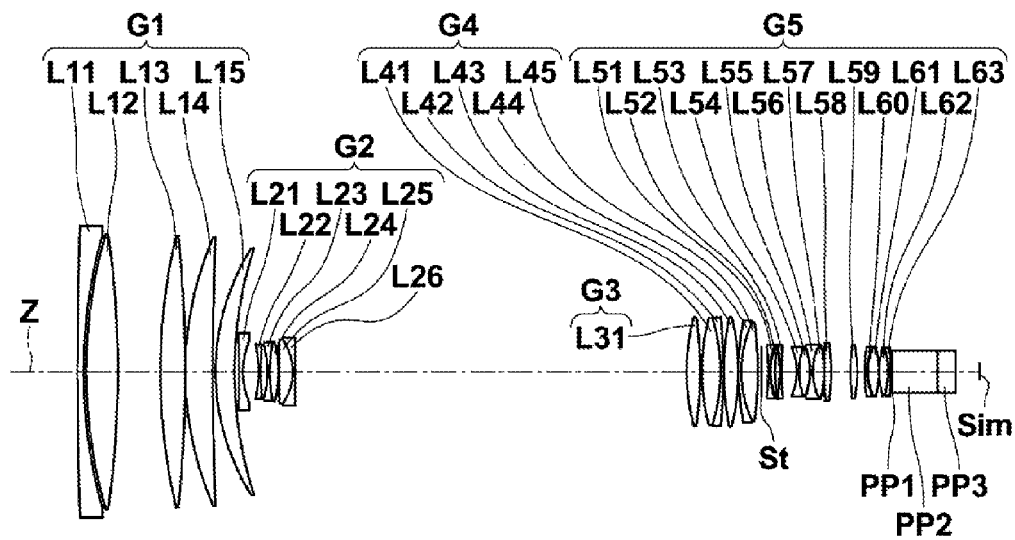
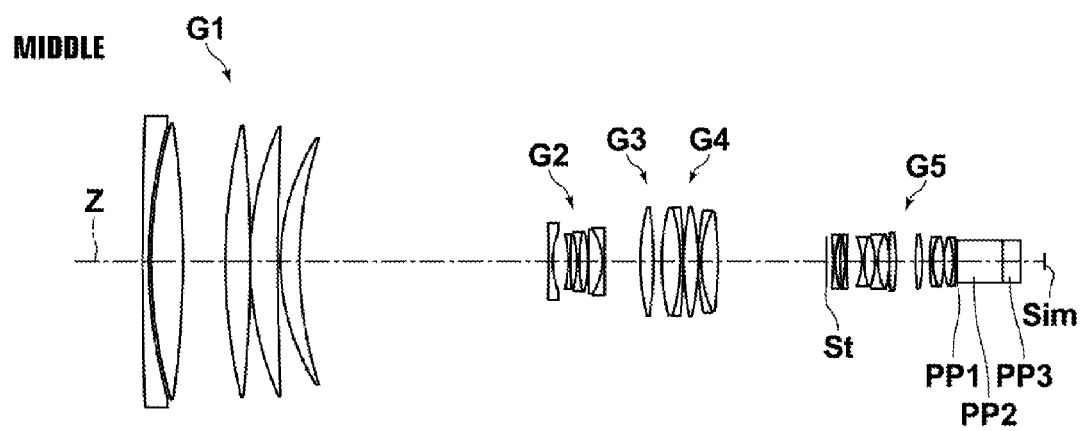
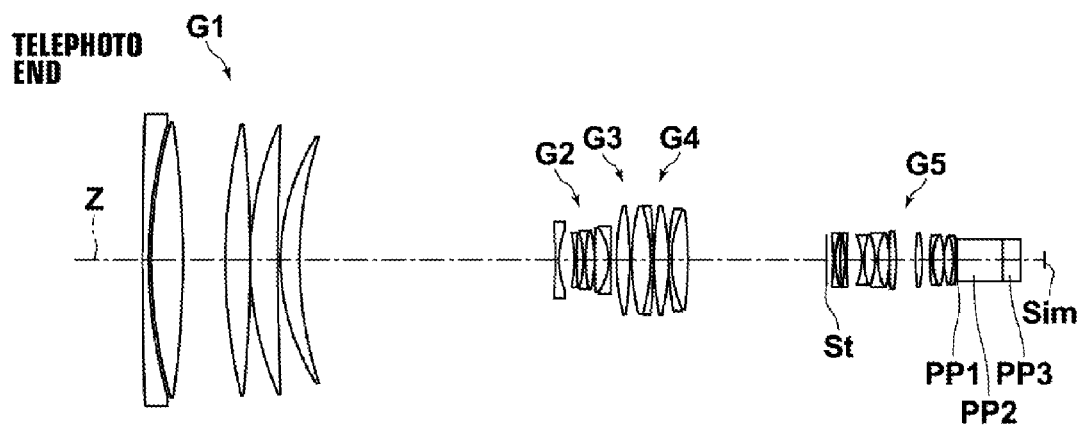

FIG.9
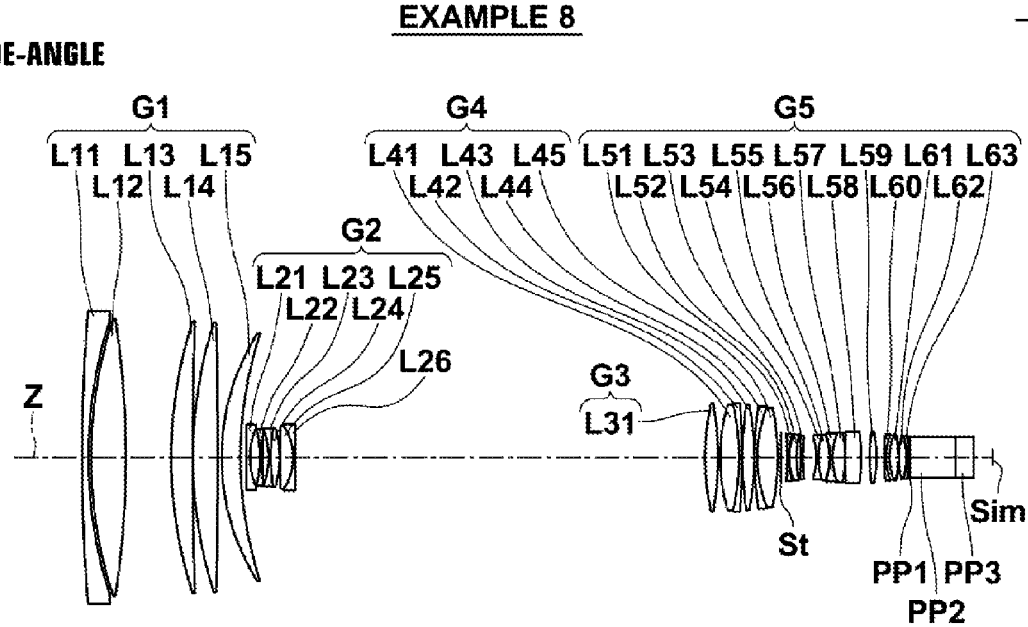
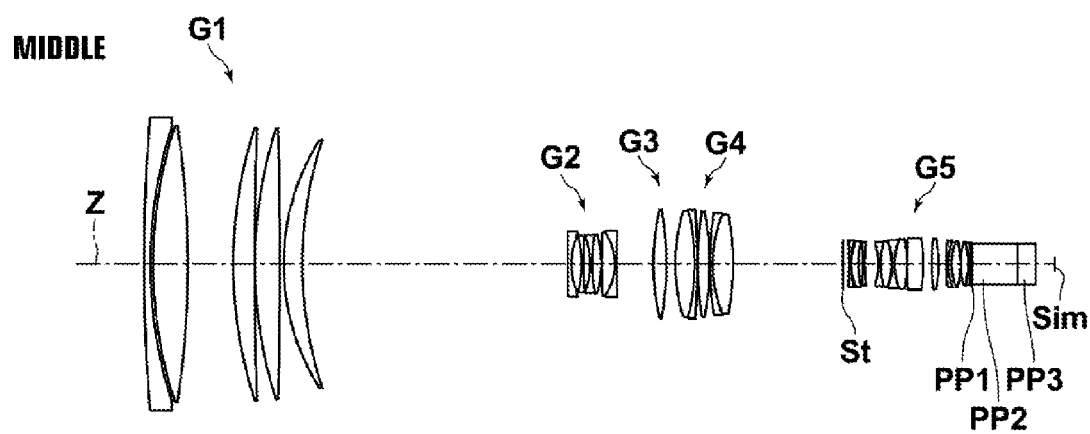
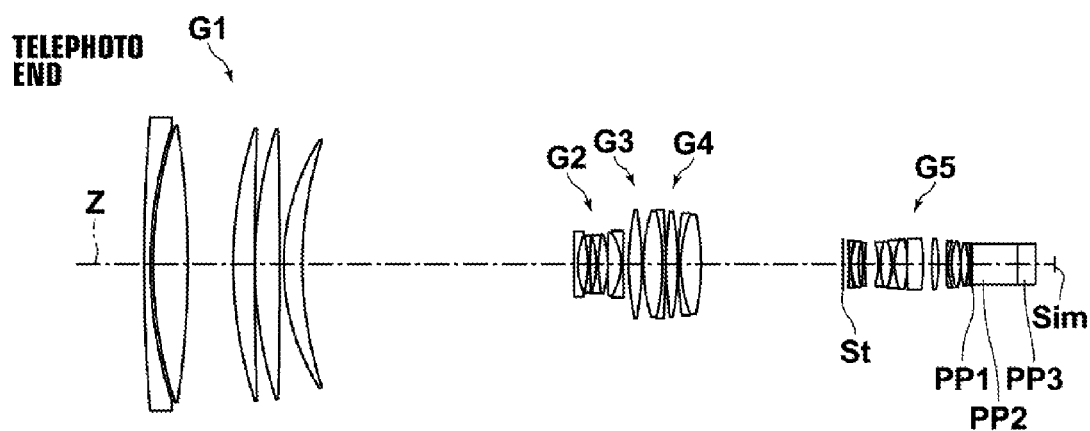

FIG.13 EXAMPLE 4

ZOOM LENS AND IMAGING APPARATUS

CROSS-REFERENCE TO RELATED APPLICATIONS

The present application claims priority under 35 U.S.C. §119 to Japanese Patent Application No. 2014-117374, filed on Jun. 6, 2014, and Japanese Patent Application No. 2015-045036, filed on Mar. 6, 2015. Each of the above applications is hereby expressly incorporated by reference, in its entirety, into the present application.

BACKGROUND OF THE INVENTION

Field of the Invention

The present invention relates to a zoom lens for use with electronic cameras, such as digital cameras, video cameras, broadcasting cameras, monitoring cameras, etc., and an imaging apparatus provided with the zoom lens.

Description of the Related Art

As a zoom lens for television cameras, those having a five-group configuration as a whole for achieving high performance, where three lens groups are moved during magnification change, are proposed in Japanese Unexamined Patent Publication Nos. 7(1995)-248449 and 2009-128491 (hereinafter, Patent Documents 1 and 2, respectively).

Further, as a zoom lens having relatively high zoom magnification, those having a four-group configuration as a whole, where two lens groups are moved during magnification change, are proposed in Japanese Unexamined Patent Publication Nos. 2010-091788 and 2011-039399 (hereinafter, Patent Documents 3 and 4, respectively).

SUMMARY OF THE INVENTION

With high-magnification zoom lenses, in general, increase of amounts of movement of the lens elements for magnification change results in increased distance from the stop to the front lens element, and it is difficult to achieve wide angle of view without increasing the lens diameter and the weight of the lens.

Patent Documents 1 and 2 do not achieve sufficiently high zoom magnification. Patent Documents 3 and 4 do achieve high zoom magnification; however, they do not achieve sufficiently wide angle of view.

In view of the above-described circumstances, the present invention is directed to providing a zoom lens that has high optical performance, and achieves both high magnification and wide angle of view, as well as an imaging apparatus provided with the zoom lens.

An aspect of the zoom lens of the invention is a zoom lens consisting of, in order from the object side, a first lens group having a positive refractive power, a second lens group having a negative refractive power, a third lens group having a positive refractive power, a fourth lens group having a positive refractive power, and a fifth lens group having a positive refractive power, wherein, during magnification change, the first lens group and the fifth lens group are fixed relative to an image plane, and the second lens group, the third lens group, and the fourth lens group are moved to change distances therebetween, during magnification change from the wide-angle end to the telephoto end, the second lens group is moved from the object side toward the image plane side, and the fourth lens group is moved from the image plane side toward the object side, the fifth lens group comprises at least two negative lenses, and the condition expression (1) below is satisfied:

$$1.90 < LABnd \quad (1),$$

where LABnd is an average value of a refractive index LAnd with respect to the d-line of an LA negative lens, which is the first negative lens from the image plane side of the fifth lens group, and a refractive index LBnd with respect to the d-line of an LB negative lens, which is the second negative lens from the image plane side of the fifth lens group.

It is more preferred that the condition expression (1-1) below be satisfied:

$$1.94 < LABnd \quad (1\text{-}1).$$

In the zoom lens of the invention, it is preferred that the condition expression (2) below be satisfied, and it is more preferred that the condition expression (2-1) below be satisfied:

$$0.42 < LAnd - LCnd \quad (2),$$

$$0.45 < LAnd - LCnd \quad (2\text{-}1),$$

where LCnd is a refractive index with respect to the d-line of an LC positive lens, which is the first positive lens from the image plane side of the fifth lens group.

It is preferred that the condition expression (3) below be satisfied, and it is more preferred that the condition expression (3-1) below be satisfied:

$$25 < LABvd < 40 \quad (3),$$

$$30 < LABvd < 36 \quad (3\text{-}1),$$

where LABvd is an average value of an Abbe number LAvd with respect to the d-line of the LA negative lens and an Abbe number LBvd with respect to the d-line of the LB negative lens.

It is preferred that the second lens group consist of, in order from the object side, an L21 negative lens, an L22 negative lens, a cemented lens formed by an L23 negative lens having a biconcave shape and an L24 positive lens which are cemented together in this order from the object side, and a cemented lens formed by an L25 positive lens with a convex surface toward the image plane side and an L26 negative lens with a concave surface toward the object side which are cemented together in this order from the object side.

It is preferred that the condition expression (4) below be satisfied:

$$L23vd - L24vd < L26vd - L25vd \quad (4),$$

where L23vd is an Abbe number with respect to the d-line of the L23 negative lens, L24vd is an Abbe number with respect to the d-line of the L24 positive lens, L26vd is an Abbe number with respect to the d-line of the L26 negative lens, and L25vd is an Abbe number with respect to the d-line of the L25 positive lens.

It is preferred that the first lens group consist of, in order from the object side, an L11 negative lens, an L12 positive lens, an L13 positive lens, an L14 positive lens, and an L15 positive lens.

It is preferred that an L21 negative lens, which is the most object-side negative lens of the second lens group, satisfy the condition expression (5) below:

$$25 < vd21 < 45 \quad (5),$$

where vd21 is an Abbe number with respect to the d-line of the L21 negative lens. It is more preferred that the condition expression (5-1) below be satisfied:

$$28 < vd21 < 40 \qquad (5\text{-}1).$$

The imaging apparatus of the invention comprises the above-described zoom lens of the invention.

It should be noted that the expression "consisting/consist of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, a camera shake correction mechanism, etc.

The sign (positive or negative) with respect to the surface shape and the refractive power of any lens including an aspheric surface among the lenses described above is about the paraxial region.

The zoom lens of the invention consists of, in order from the object side, the first lens group having a positive refractive power, the second lens group having a negative refractive power, the third lens group having a positive refractive power, the fourth lens group having a positive refractive power, and the fifth lens group having a positive refractive power, wherein, during magnification change, the first lens group and the fifth lens group are fixed relative to the image plane, and the second lens group, the third lens group, and the fourth lens group are moved to change distances therebetween, during magnification change from the wide-angle end to the telephoto end, the second lens group is moved from the object side toward the image plane side, and the fourth lens group is moved from the image plane side toward the object side, the fifth lens group includes at least two negative lenses, and the condition expression (1) below is satisfied:

$$1.90 < LABnd \qquad (1).$$

This configuration allows providing a zoom lens which has high optical performance and achieves both high magnification and wide angle.

The imaging apparatus of the invention, which is provided with the zoom lens of the invention, allows obtaining high image-quality, high magnification and wide-angle images.

BRIEF DESCRIPTION OF THE DRAWINGS

FIG. 1 is a sectional view illustrating the lens configuration of a zoom lens according to one embodiment of the invention (a zoom lens of Example 1), FIG. 2 is a diagram showing optical paths through the zoom lens according to one embodiment of the invention (the zoom lens of Example 1), FIG. 3 is a sectional view illustrating the lens configuration of a zoom lens of Example 2 of the invention, FIG. 4 is a sectional view illustrating the lens configuration of a zoom lens of Example 3 of the invention, FIG. 5 is a sectional view illustrating the lens configuration of a zoom lens of Example 4 of the invention, FIG. 6 is a sectional view illustrating the lens configuration of a zoom lens of Example 5 of the invention, FIG. 7 is a sectional view illustrating the lens configuration of a zoom lens of Example 6 of the invention, FIG. 8 is a sectional view illustrating the lens configuration of a zoom lens of Example 7 of the invention, FIG. 9 is a sectional view illustrating the lens configuration of a zoom lens of Example 8 of the invention.

DESCRIPTION OF THE PREFERRED EMBODIMENTS

Figure 10:
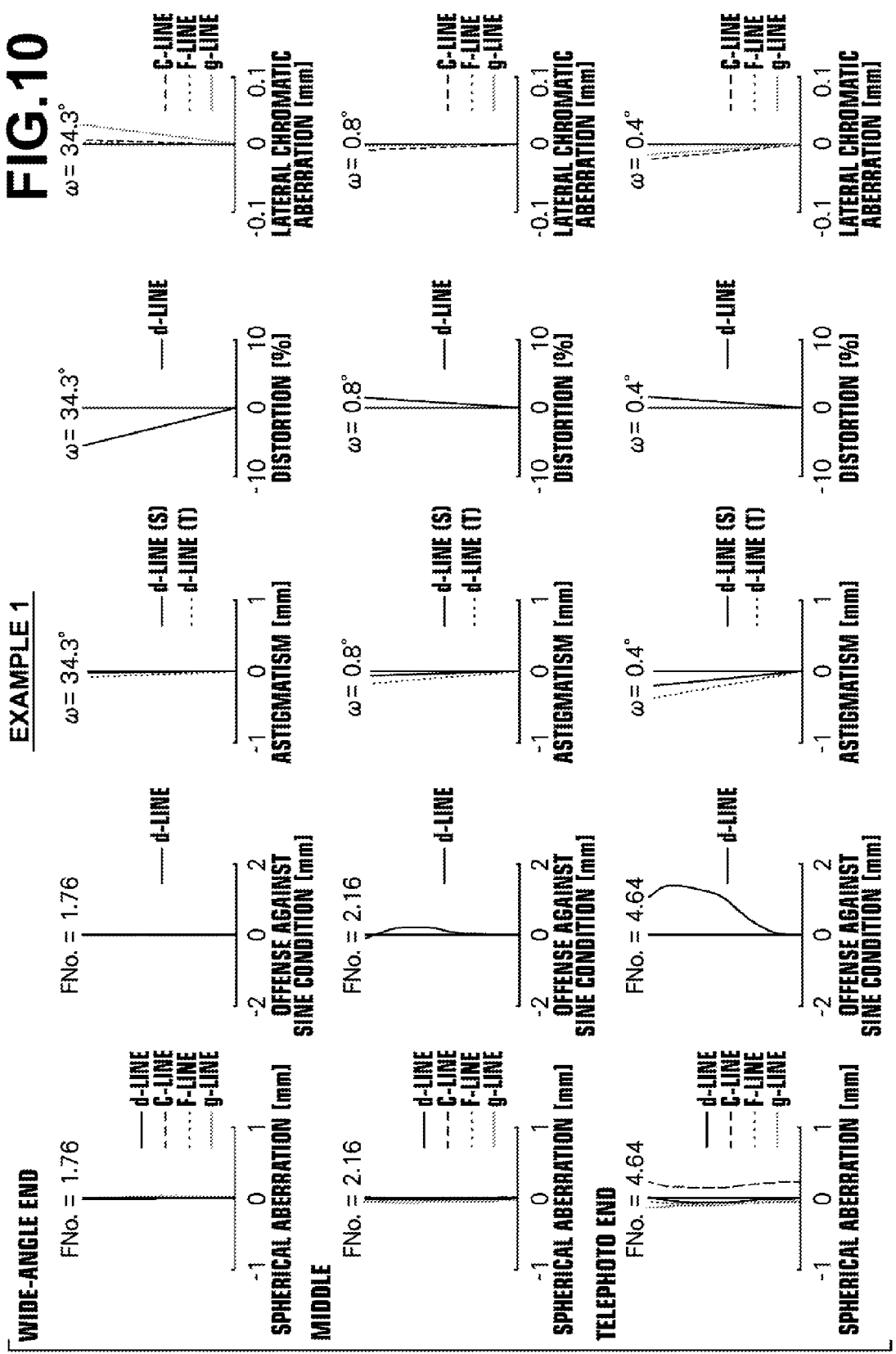
FIG. 10 shows aberration diagrams of the zoom lens of Example 1 of the invention.

Hereinafter, embodiments of the present invention will be described in detail with reference to the drawings. FIG. 1 is a sectional view illustrating the lens configuration of a zoom lens according to one embodiment of the invention, and FIG. 2 is a diagram showing optical paths through the zoom lens. The configuration example shown in FIGS. 1 and 2 is the same as the configuration of a zoom lens of Example 1, which will be described later. In FIGS. 1 and 2, the left side is the object side and the right side is the image plane side. An aperture stop St shown in each drawing does not necessarily represent the size and the shape thereof, but represents the position thereof along the optical axis Z. In the diagram showing optical paths of FIG. 2, an on-axis bundle of rays wa, and a bundle of rays wb at the maximum angle of view are shown.

As shown in FIG. 1, this zoom lens includes, in order from the object side, a first lens group G1 having a positive refractive power, a second lens group G2 having a negative refractive power, a third lens group G3 having a positive refractive power, a fourth lens group G4 having a positive refractive power, an aperture stop St, and a fifth lens group G5 having a positive refractive power.

When this zoom lens is used with an imaging apparatus, it is preferred to provide a cover glass, a prism, and various filters, such as an infrared cutoff filter and a low-pass filter, etc., between the optical system and an image plane Sim depending on the configuration of the camera on which the lens is mounted. In the example shown in FIGS. 1 and 2, optical members PP1 to PP3 in the form of plane-parallel plates, which are assumed to represent such elements, are disposed between the lens system and the image plane Sim.

During magnification change, the first lens group G1 and the fifth lens group G5 are fixed relative to the image plane Sim, and the second lens group G2, the third lens group G3, and the fourth lens group G4 are moved to change distances therebetween. During magnification change from the wide-angle end to the telephoto end, the second lens group G2 is always moved from the object side toward the image plane side, and the fourth lens group G4 is always moved from the image plane side toward the object side.

In this zoom lens, the second lens group G2 works to effect magnification change, and the third lens group G3 and the fourth lens group G4 work to correct for changes of the image plane along with magnification change. Further, the third lens group G3 and the fourth lens group G4 are moved relative to each other, and this allows successfully correcting for changes of spherical aberration and coma aberration during magnification change, as well as correcting for changes of the image plane during magnification change.

The fifth lens group G5 includes at least two negative lenses. This allows preventing overcorrection of spherical aberration.

The zoom lens of the invention is configured to satisfy the condition expression (1) below. Satisfying the lower limit of the condition expression (1) allows suppressing overcorrection related to Petzval sum, which tends to occur with a high magnification zoom lens. This facilitates correcting both astigmatism and field curvature, and is advantageous for achieving wide angle of view. It should be noted that higher performance can be obtained when the condition expression (1-1) below is satisfied.

$$1.90 < LABnd \quad (1),$$

$$1.94 < LABnd \quad (1\text{-}1),$$

where LABnd is an average value of a refractive index LAnd with respect to the d-line of an LA negative lens, which is the first negative lens from the image plane side of the fifth lens group, and a refractive index LBnd with respect to the d-line of an LB negative lens, which is the second negative lens from the image plane side of the fifth lens group.

It is preferred that, in the zoom lens of this embodiment, the condition expression (2) below be satisfied. Satisfying the lower limit of the condition expression (2) allows obtaining the effect of satisfying the condition expression (1) in a more pronounced manner, and this allows successfully suppressing the Petzval sum and is advantageous for achieving wide angle of view. It should be noted that higher performance can be obtained when the condition expression (2-1) below is satisfied.

$$0.42 < LAnd - LCnd \quad (2),$$

$$0.45 < LAnd - LCnd \quad (2\text{-}1),$$

where LCnd is a refractive index with respect to the d-line of an LC positive lens, which is the first positive lens from the image plane side of the fifth lens group.

It is preferred that the condition expression (3) below be satisfied. Satisfying the lower limit of the condition expression (3) is advantageous for correcting lateral chromatic aberration. Satisfying the upper limit of the condition expression (3) is advantageous for correcting longitudinal chromatic aberration. It should be noted that higher performance can be obtained when the condition expression (3-1) below is satisfied.

$$25 < LABvd < 40 \quad (3),$$

$$30 < LABvd < 36 \quad (3\text{-}1),$$

where LABvd is an average value of an Abbe number LAvd with respect to the d-line of the LA negative lens and an Abbe number LBvd with respect to the d-line of the LB negative lens.

It is preferred that the second lens group G2 consist of, in order from the object side, an L21 negative lens L21, an L22 negative lens L22, a cemented lens formed by an L23 negative lens L23 having a biconcave shape and an L24 positive lens L24 which are cemented together in this order from the object side, and a cemented lens formed by an L25 positive lens L25 with a convex surface toward the image plane side and an L26 negative lens L26 with a concave surface toward the object side which are cemented together in this order from the object side.

This configuration allows achieving wide angle of view while suppressing changes of chromatic aberration which occurs with a high magnification zoom lens. In particular, distributing the negative refractive power of the second lens group G2 among the four negative lenses L21, L22, L23, and L26, and distributing the positive refractive power of the second lens group G2 between the two positive lenses L24 and L25 allows suppressing changes of aberrations, in particular, distortion and spherical aberration, while maintaining the negative refractive power of the second lens group G2 necessary for achieving high magnification. Further, disposing the three negative lenses L21, L22, and L23 consecutively in order from the object side results in a small angle between the optical axis and the principal ray at the peripheral angle of view entering the subsequent lenses at the wide-angle end, and this is advantageous for achieving wide angle of view. The cemented surface between the L25 positive lens L25 and the L26 negative lens L26 which is convex toward the image plane side allows suppressing variation of spherical aberration depending on the wavelength while correcting longitudinal chromatic aberration at the telephoto end.

It is preferred that the second lens group G2 having the above-described configuration satisfy the condition expression (4) below. At the telephoto end, the incident angle of the on-axis marginal ray on the cemented surface between the L25 positive lens L25 and the L26 negative lens L26 which is convex toward the image plane, among the two cemented surfaces of the second lens group G2, is smaller than the incident angle of the on-axis marginal ray on the other cemented surface. Therefore, the variation of spherical aberration depending on the wavelength at the telephoto end can be suppressed by setting a larger difference between Abbe numbers at this cemented surface, i.e., by setting a larger amount of correction of chromatic aberration at this cemented surface.

$$L23vd - L24vd < L26vd - L25vd \quad (4),$$

where L23vd is an Abbe number with respect to the d-line of the L23 negative lens, L24vd is an Abbe number with respect to the d-line of the L24 positive lens, L26vd is an Abbe number with respect to the d-line of the L26 negative lens, and L25vd is an Abbe number with respect to the d-line of the L25 positive lens.

It is preferred that the first lens group G1 includes, in order from the object side, an L11 negative lens L11, an L12 positive lens L12, an L13 positive lens L13, an L14 positive lens L14, and an L15 positive lens L15. With a zoom lens having a long focal length at the telephoto end, suppressing secondary chromatic aberration is a significant issue. To this end, it is necessary to use fluorite or a material having the similar abnormal dispersion to form the positive lenses; however, such materials typically have low refractive index. Therefore it is effective to distribute the positive refractive power among the four positive lenses L12, L13, L14, and L15 in order to suppress the spherical aberration at the telephoto end. The above-described configuration facilitates suppressing the secondary chromatic aberration. Further, disposing the L11 negative lens L11 at the most object-side position allows reducing the incident angle of the principal ray at the peripheral angle of view entering the L12 positive lens L12 at the wide-angle end, and this is advantageous for achieving wide angle of view.

It is preferred that an L21 negative lens, which is the most object-side negative lens of the second lens group G2, satisfy the condition expression (5) below. Satisfying the lower limit of the condition expression (5) allows suppressing changes of primary lateral chromatic aberration and primary longitudinal chromatic aberration during magnification change. Satisfying the upper limit of condition expression (5) allows correcting secondary lateral chromatic aberration at the wide-angle end which occurs at the first lens group G1 when secondary longitudinal chromatic aberration at the telephoto end is corrected, thereby allowing well balanced correction of the secondary longitudinal chromatic aberration at the telephoto end, the lateral chromatic aberration at the telephoto end, and the secondary lateral chromatic aberration at the wide-angle end. It should be noted that higher performance can be obtained when the condition expression (5-1) below is satisfied.

$$25 < vd21 < 45 \quad (5),$$

$$28 < vd21 < 40 \quad (5\text{-}1),$$

where vd21 is an Abbe number with respect to the d-line of the L21 negative lens.

In the example shown in FIGS. 1 and 2, the optical members PP1 to PP3 are disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the invention are described.

First, a zoom lens of Example 1 is described. FIG. 1 is a sectional view illustrating the lens configuration of the zoom lens of Example 1. It should be noted that, in FIG. 1, and FIGS. 3 to 9 corresponding to Examples 2 to 8, which will be described later, the left side is the object side and the right side is the image plane side. The aperture stop St shown in the drawings does not necessarily represent the size and the shape thereof, but represents the position thereof along the optical axis Z.

In the zoom lens of Example 1, the first lens group G1 is formed by five lenses, i.e., lenses L11 to L15, the second lens group G2 is formed by six lenses, i.e., lenses L21 to L26, the third lens group G3 is formed by one lens L31, the fourth lens group G4 is formed by four lenses, i.e., lenses L41 to L44, and the fifth lens group G5 is formed by thirteen lenses, i.e., lenses L51 to L63.

Table 1 shows basic lens data of the zoom lens of Example 1, Table 2 shows data about specifications of the zoom lens, Table 3 shows data about surface distances to be changed of the zoom lens, and Table 4 shows data about aspheric coefficients of the zoom lens. In the following description, meanings of symbols used in the tables are explained with respect to Example 1 as an example. The same explanations basically apply to those with respect to Examples 2 to 8.

In the lens data shown in Table 1, each value in the column of "Surface No." represents each surface number, where the object-side surface of the most object-side element is the 1st surface and the number is sequentially increased toward the image plane side, each value in the column of "Radius of Curvature" represents the radius of curvature of each surface, and each value in the column of "Surface Distance" represents the distance along the optical axis Z between each surface and the next surface. Each value in the column of "nd" represents the refractive index with respect to the d-line (the wavelength of 587.6 nm) of each optical element, each value in the column of "vd" represents the Abbe number with respect to the d-line (the wavelength of 587.6 nm) of each optical element, and each value in the column of "θg,F" represents the partial dispersion ratio of each optical element.

It should be noted that the partial dispersion ratio θg,F is expressed by the formula below:

$$\theta g, F = (Ng - NF)/(NF - NC),$$

where Ng is a refractive index with respect to the g-line, NF is a refractive index with respect to F-line, and NC is a refractive index with respect to the C-line.

The sign with respect to the radius of curvature is provided such that a positive radius of curvature indicates a surface shape that is convex toward the object side, and a negative radius of curvature indicates a surface shape that is convex toward the image plane side. The basic lens data also includes data of the aperture stop St and the optical members PP1 to PP3, and the surface number and the text "(stop)" are shown at the position in the column of the surface number corresponding to the aperture stop St. In the lens data shown in Table 1, the value of each surface distance that is changed during magnification change is represented by the symbol "DD[surface number]". The numerical value corresponding to each DD[surface number] is shown in Table 3.

The data about specifications shown in Table 2 show values of zoom magnification, focal length f', back focus Bf', f-number FNo., and total angle of view 2ω.

With respect to the basic lens data, the data about specifications, and the data about surface distances to be changed, the unit of angle is degrees, and the unit of length is millimeters; however, any other suitable units may be used since optical systems are usable when they are proportionally enlarged or reduced.

In the lens data shown in Table 1, the symbol "*" is added to the surface number of each aspheric surface, and a numerical value of the paraxial radius of curvature is shown as the radius of curvature of each aspheric surface. In the data about aspheric coefficients shown in Table 4, the surface number of each aspheric surface and aspheric coefficients about each aspheric surface are shown. The aspheric coefficients are values of the coefficients KA and Am (where m=3, . . . , 20) in the formula of aspheric surface shown below;

$$Zd = C \cdot h^2 / \{1 + (1 - KA \cdot C^2 \cdot h^2)^{1/2}\} + \Sigma Am \cdot h^m,$$

where Zd is a depth of the aspheric surface (a length of a perpendicular line from a point with a height h on the aspheric surface to a plane tangent to the apex of the aspheric surface and perpendicular to the optical axis), h is the height (a distance from the optical axis), C is a reciprocal of the paraxial radius of curvature, and KA and Am are aspheric coefficients (where m=3, . . . , 20).

TABLE 1

Example 1 - Lens Data

| Surface No. | Radius of Curvature | Surface Distance | nd | vd | θg, F |
|---|---|---|---|---|---|
| 1 | 2758.4371 | 4.4000 | 1.83400 | 37.16 | 0.57759 |
| 2 | 347.8180 | 2.2600 | | | |
| 3 | 353.7539 | 24.3000 | 1.43387 | 95.20 | 0.53733 |
| 4 | −666.4931 | 28.4000 | | | |
| 5 | 418.1856 | 16.3800 | 1.43387 | 95.20 | 0.53733 |
| 6 | −1937.2403 | 0.1100 | | | |
| 7 | 230.5824 | 22.0200 | 1.43387 | 95.20 | 0.53733 |

TABLE 1-continued

Example 1 - Lens Data

| Surface No. | Radius of Curvature | Surface Distance | nd | vd | θg, F |
|---|---|---|---|---|---|
| 8 | 2488.7921 | 2.1100 | | | |
| 9 | 193.0855 | 13.7800 | 1.43875 | 94.93 | 0.53433 |
| 10 | 375.2290 | DD[10] | | | |
| *11 | ∞ | 2.8000 | 1.90366 | 31.32 | 0.59481 |
| 12 | 87.7087 | 3.6231 | | | |
| 13 | −276.3450 | 1.7000 | 2.00100 | 29.13 | 0.59952 |
| 14 | 61.6678 | 6.0762 | | | |
| 15 | −81.4336 | 1.7200 | 1.90043 | 37.37 | 0.57720 |
| 16 | 71.5780 | 4.6500 | 1.80809 | 22.76 | 0.63073 |
| 17 | −491.0384 | 0.1200 | | | |
| 18 | 197.1668 | 9.6900 | 1.80809 | 22.76 | 0.63073 |
| 19 | −36.8210 | 1.7000 | 1.81600 | 46.62 | 0.55682 |
| 20 | −1318.6602 | DD[20] | | | |
| 21 | 228.3648 | 10.2000 | 1.49700 | 81.54 | 0.53748 |
| *22 | −164.6345 | DD[22] | | | |
| 23 | 92.3550 | 13.4300 | 1.43700 | 95.10 | 0.53364 |
| 24 | −316.4534 | 0.2500 | | | |
| *25 | 227.5428 | 5.7000 | 1.43700 | 95.10 | 0.53364 |
| 26 | −613.2058 | 0.1200 | | | |
| 27 | 264.9897 | 2.0200 | 1.80000 | 29.84 | 0.60178 |
| 28 | 78.0000 | 14.2700 | 1.43700 | 95.10 | 0.53364 |
| 29 | −182.7058 | DD[29] | | | |
| 30 (stop) | ∞ | 5.2100 | | | |
| 31 | −143.8399 | 1.5000 | 1.77250 | 49.60 | 0.55212 |
| 32 | 62.1750 | 0.1200 | | | |
| 33 | 45.5708 | 3.9900 | 1.80518 | 25.46 | 0.61572 |
| 34 | 122.8996 | 3.0300 | | | |
| 35 | −124.1653 | 1.5000 | 1.48749 | 70.23 | 0.53007 |
| 36 | 301.7353 | 6.3100 | | | |
| 37 | −119.7638 | 1.8000 | 1.80400 | 46.58 | 0.55730 |
| 38 | 79.0480 | 4.8500 | 1.80518 | 25.43 | 0.61027 |
| 39 | −105.3465 | 1.6800 | | | |
| 40 | −50.3148 | 3.5000 | 1.88300 | 40.76 | 0.56679 |
| 41 | 49.1400 | 9.7900 | 1.54072 | 47.23 | 0.56511 |
| 42 | −49.1400 | 0.1200 | | | |
| 43 | 103.1349 | 14.2700 | 1.83481 | 42.73 | 0.56486 |
| 44 | −1054.0996 | 7.9200 | | | |
| 45 | 1676.5876 | 6.3800 | 1.72916 | 54.68 | 0.54451 |
| 46 | −58.7491 | 0.1200 | | | |
| 47 | −788.2525 | 5.5000 | 1.95375 | 32.32 | 0.59015 |
| 48 | 37.8837 | 1.2100 | | | |
| 49 | 40.1643 | 14.8800 | 1.56883 | 56.36 | 0.54890 |
| 50 | −74.6440 | 0.1500 | | | |
| 51 | 56.8324 | 5.7900 | 1.48749 | 70.23 | 0.53007 |
| 52 | −93.6800 | 3.4700 | 1.95375 | 32.32 | 0.59015 |
| 53 | −539.4314 | 0.2500 | | | |
| 54 | ∞ | 1.0000 | 1.51633 | 64.14 | 0.53531 |
| 55 | ∞ | 0.0000 | | | |
| 56 | ∞ | 33.0000 | 1.60863 | 46.60 | 0.56787 |
| 57 | ∞ | 13.2000 | 1.51633 | 64.14 | 0.53531 |
| 58 | ∞ | 17.3072 | | | |

TABLE 2

Example 1 - Specifications (d-line)

| | Wide Angle End | Middle | Telephoto End |
|---|---|---|---|
| Zoom Magnification | 1.0 | 48.0 | 103.0 |
| f | 8.69 | 417.22 | 895.29 |
| Bf | 47.19 | 47.19 | 47.19 |
| FNo. | 1.76 | 2.16 | 4.64 |
| 2ω[°] | 68.6 | 1.6 | 0.8 |

TABLE 3

Example 1 - Distances with respect to Zoom

| | Wide Angle End | Middle | Telephoto End |
|---|---|---|---|
| DD[10] | 2.4775 | 181.1074 | 187.6171 |
| DD[20] | 295.1513 | 38.9769 | 3.9195 |
| DD[22] | 3.0900 | 9.7300 | 2.5900 |
| DD[29] | 1.9491 | 72.8536 | 108.5413 |

TABLE 4

Example 1 - Aspheric Coefficients

| | Surface No. | | |
|---|---|---|---|
| | 11 | 22 | 25 |
| KA | 1.0000000E+00 | 1.0000000E+00 | 1.0000000E+00 |
| A4 | 5.6023431E−07 | 1.6745016E−07 | −3.2928660E−07 |
| A6 | 5.5737260E−10 | −4.2600970E−10 | −6.3312762E−10 |
| A8 | −5.9458545E−12 | 1.1531254E−12 | 1.8433516E−12 |
| A10 | 3.2911833E−14 | −1.7585791E−15 | −3.2645155E−15 |
| A12 | −9.8784592E−17 | 1.6366241E−18 | 3.6730696E−18 |
| A14 | 1.4175173E−19 | −9.2252153E−22 | −2.6523443E−21 |
| A16 | −2.4068796E−23 | 2.9245702E−25 | 1.1923581E−24 |
| A18 | −1.6366837E−25 | −4.1873551E−29 | −3.0407546E−28 |
| A20 | 1.3060328E−28 | 8.2582942E−34 | 3.3622504E−32 |

FIG. 10 shows aberration diagrams of the zoom lens of Example 1. The aberration diagrams shown at the top of FIG. 10 are those of spherical aberration, offense against the sine condition, astigmatism, distortion, and lateral chromatic aberration at the wide-angle end in this order from the left side, the aberration diagrams shown at the middle of FIG. 10 are those of spherical aberration, offense against the sine condition, astigmatism, distortion, and lateral chromatic aberration at the middle position in this order from the left side, and the aberration diagrams shown at the bottom of FIG. 10 are those of spherical aberration, offense against the sine condition, astigmatism, distortion, and lateral chromatic aberration at the telephoto end in this order from the left side. These aberration diagrams show aberrations when the object distance is infinity. The aberration diagrams of spherical aberration, offense against the sine condition, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the gray solid line, respectively. The aberration diagrams of astigmatism show those in the sagittal direction and the tangential direction in the solid line, and the short dashed line, respectively. The aberration diagrams of lateral chromatic aberration show those with respect to the C-line (the wavelength of 656.3 nm) the F-line (the wavelength of 486.1 nm), and the g-line (the wavelength of 435.8 nm) in the long dashed line, the short dashed line, and the gray solid line, respectively. The "FNo." in the aberration diagrams of spherical aberration and offense against the sine condition means "f-number", and the "ω" in the other aberration diagrams means "half angle of view".

Figure 11:
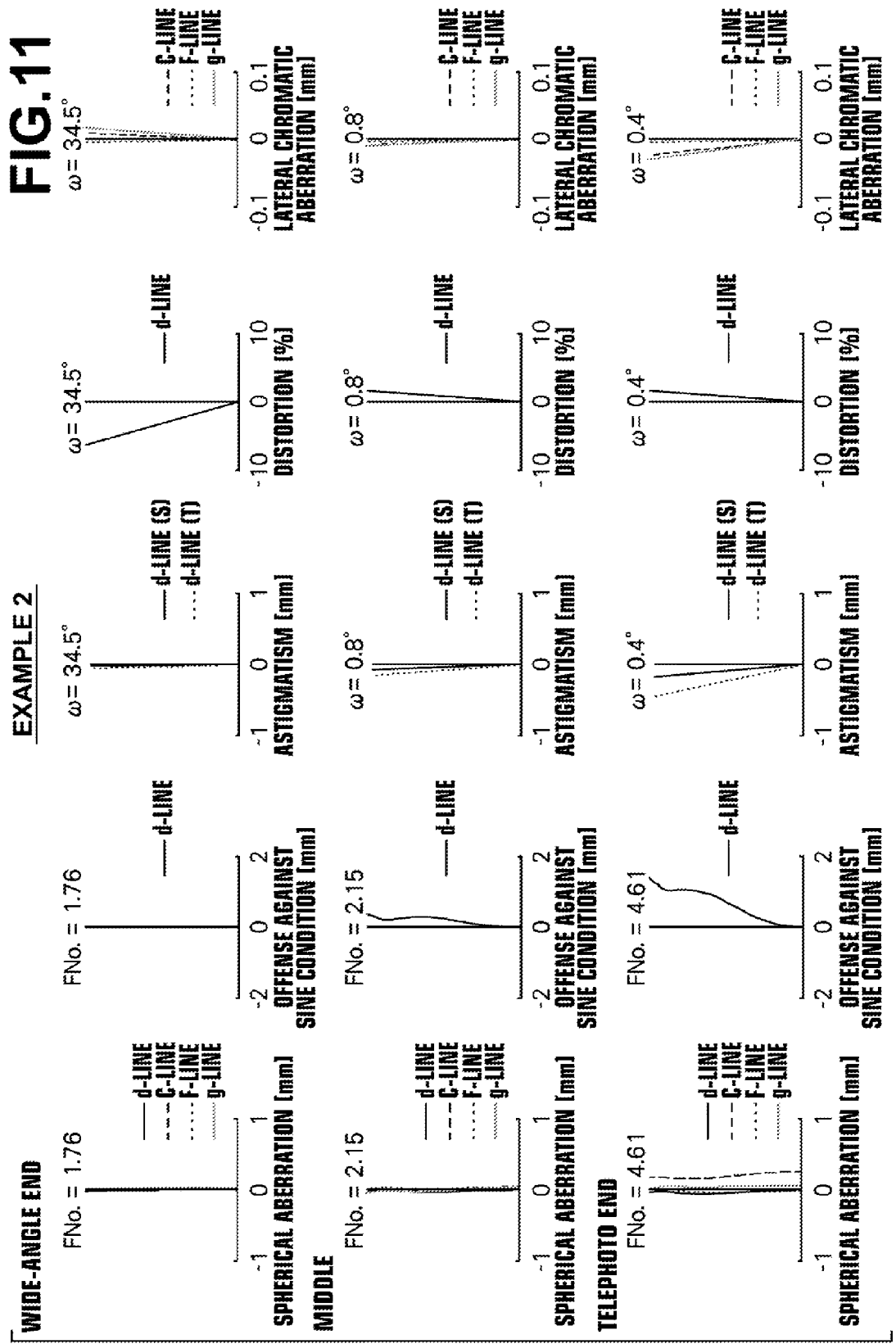
FIG. 11 shows aberration diagrams of the zoom lens of Example 2 of the invention.

Next, a zoom lens of Example 2 is described. FIG. 3 is a sectional view illustrating the lens configuration of the zoom lens of Example 2. The zoom lens of Example 2 differs from the zoom lens of Example 1 in that, in the zoom lens of Example 2, the fourth lens group G4 is formed by five lenses, i.e., lenses L41 to L45, and the fifth lens group G5 is formed by fourteen lenses, i.e., lenses L51 to L64. Table 5 shows basic lens data of the zoom lens of Example 2, Table 6 shows data about specifications of the zoom lens, Table 7 shows data about surface distances to be changed of the zoom lens, Table 8 shows data about aspheric coefficients of the zoom lens, and FIG. 11 shows aberration diagrams of the zoom lens.

TABLE 5

Example 2 - Lens Data

| Surface No. | Radius of Curvature | Surface Distance | nd | νd | θg, F |
|---|---|---|---|---|---|
| 1 | 1621.8264 | 4.4000 | 1.83400 | 37.34 | 0.57908 |
| 2 | 321.1166 | 2.3074 | | | |
| 3 | 319.8571 | 24.6282 | 1.43387 | 95.20 | 0.53733 |
| 4 | −846.0399 | 27.3529 | | | |
| 5 | 351.3661 | 20.0650 | 1.43387 | 95.20 | 0.53733 |
| 6 | −1402.9128 | 0.1200 | | | |
| 7 | 233.6545 | 20.0438 | 1.43387 | 95.20 | 0.53733 |
| 8 | 1255.5213 | 2.0341 | | | |
| 9 | 192.7395 | 13.1724 | 1.43875 | 94.93 | 0.53433 |
| 10 | 363.0563 | DD[10] | | | |
| *11 | −2777777.9346 | 2.8000 | 1.90366 | 31.32 | 0.59481 |
| 12 | 98.7837 | 4.9567 | | | |
| 13 | −102.1714 | 1.7000 | 2.00100 | 29.13 | 0.59952 |
| 14 | 66.3514 | 5.8916 | | | |
| 15 | −81.8572 | 1.7000 | 1.95375 | 32.32 | 0.59015 |
| 16 | 72.4934 | 6.6056 | 1.80809 | 22.76 | 0.63073 |
| 17 | −121.1396 | 0.1200 | | | |
| 18 | 188.8503 | 10.2510 | 1.80809 | 22.76 | 0.63073 |
| 19 | −39.5623 | 1.7000 | 1.81600 | 46.62 | 0.55682 |
| 20 | 753.8351 | DD[20] | | | |
| 21 | 268.1342 | 9.0636 | 1.59282 | 68.63 | 0.54414 |
| *22 | −186.9580 | DD[22] | | | |
| 23 | 116.3677 | 15.0601 | 1.43875 | 94.93 | 0.53433 |
| 24 | −135.2846 | 2.0000 | 1.59270 | 35.31 | 0.59336 |
| 25 | −288.4689 | 0.1200 | | | |
| *26 | 210.0268 | 8.6054 | 1.43875 | 94.93 | 0.53433 |
| 27 | −250.1556 | 0.1200 | | | |
| 28 | 168.6619 | 2.0000 | 1.80000 | 29.84 | 0.60178 |
| 29 | 73.2023 | 12.5372 | 1.43875 | 94.93 | 0.53433 |
| 30 | −456.7046 | DD[30] | | | |
| 31 (stop) | ∞ | 5.0115 | | | |
| 32 | −84.0203 | 1.5000 | 1.77250 | 49.60 | 0.55212 |
| 33 | 61.9110 | 0.1200 | | | |
| 34 | 46.2228 | 4.5175 | 1.80518 | 25.42 | 0.61616 |
| 35 | 211.3971 | 1.8300 | | | |
| 36 | −177.3816 | 1.5000 | 1.48749 | 70.23 | 0.53007 |
| 37 | 125.6004 | 7.2756 | | | |
| 38 | −114.0392 | 1.8000 | 1.80400 | 46.58 | 0.55730 |
| 39 | 63.0729 | 6.2400 | 1.80518 | 25.43 | 0.61027 |
| 40 | −105.3906 | 1.9324 | | | |
| 41 | −46.7551 | 2.1750 | 2.00100 | 29.13 | 0.59952 |
| 42 | 492.1494 | 6.8481 | 1.51823 | 58.90 | 0.54567 |
| 43 | −38.0880 | 0.1200 | | | |
| 44 | 344.0131 | 18.2262 | 1.59270 | 35.31 | 0.59336 |
| 45 | −192.6033 | 6.7109 | | | |
| 46 | 654.7236 | 9.9919 | 1.68893 | 31.07 | 0.60041 |
| 47 | −87.5160 | 0.1200 | | | |
| 48 | 201.4706 | 7.2349 | 1.91082 | 35.25 | 0.58224 |
| 49 | 45.5310 | 0.1910 | | | |
| 50 | 42.6154 | 7.8868 | 1.51742 | 52.43 | 0.55649 |
| 51 | −76.2445 | 0.1200 | | | |
| 52 | 70.9272 | 6.7891 | 1.48749 | 70.23 | 0.53007 |
| 53 | −49.5244 | 1.8295 | 2.00100 | 29.13 | 0.59952 |
| 54 | −10986903.2517 | 3.5616 | 1.51823 | 58.90 | 0.54567 |
| 55 | −79.2918 | 0.2498 | | | |
| 56 | ∞ | 1.0000 | 1.51633 | 64.14 | 0.53531 |
| 57 | ∞ | 0.0000 | | | |
| 58 | ∞ | 33.0000 | 1.60863 | 46.60 | 0.56787 |
| 59 | ∞ | 13.2000 | 1.51633 | 64.14 | 0.53531 |
| 60 | ∞ | 17.3478 | | | |

TABLE 6

Example 2 - Specifications (d-line)

| | Wide Angle End | Middle | Telephoto End |
|---|---|---|---|
| Zoom Magnification | 1.0 | 48.0 | 103.0 |
| f | 8.69 | 417.36 | 895.58 |
| Bf | 47.48 | 47.48 | 47.48 |
| FNo. | 1.76 | 2.15 | 4.61 |
| 2ω [°] | 69.0 | 1.6 | 0.8 |

TABLE 7

Example 2 - Distances with respect to Zoom

| | Wide Angle End | Middle | Telephoto End |
|---|---|---|---|
| DD[10] | 2.1062 | 178.0467 | 184.5595 |
| DD[20] | 291.3621 | 38.9988 | 3.9233 |
| DD[22] | 1.2197 | 7.1626 | 1.2218 |
| DD[30] | 3.5802 | 74.0602 | 108.5638 |

TABLE 8

Example 2 - Aspheric Coefficients

| | Surface No. | | |
|---|---|---|---|
| | 11 | 22 | 26 |
| KA | 1.0000000E+00 | 1.0000000E+00 | 1.0000000E+00 |
| A4 | 1.3617401E−06 | 6.8856999E−08 | −2.8066697E−07 |
| A6 | 2.1211905E−11 | 5.4670539E−12 | −3.1663334E−12 |
| A8 | −8.7707146E−14 | 4.8525628E−15 | 4.6640532E−15 |
| A10 | 4.1075859E−16 | −1.8961447E−18 | −1.6978421E−18 |

Figure 12:
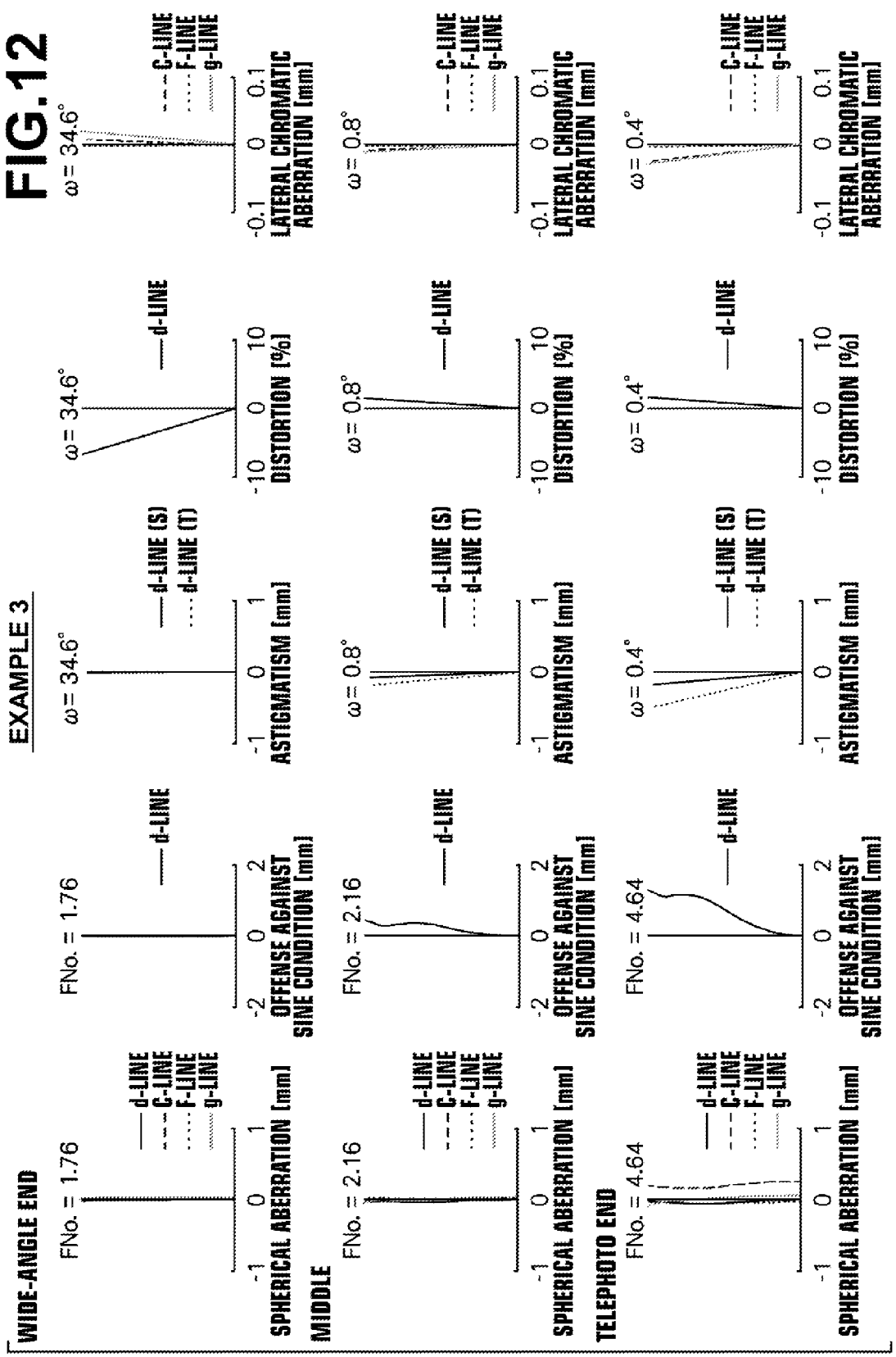
FIG. 12 shows aberration diagrams of the zoom lens of Example 3 of the invention.

Next, a zoom lens of Example 3 is described. FIG. 4 is a sectional view illustrating the lens configuration of the zoom lens of Example 3. The zoom lens of Example 3 is formed by the same number of lenses as the zoom lens of Example 2. Table 9 shows basic lens data of the zoom lens of Example 3, Table 10 shows data about specifications of the zoom lens, Table 11 shows data about surface distances to be changed of the zoom lens, Table 12 shows data about aspheric coefficients of the zoom lens, and FIG. 12 shows aberration diagrams of the zoom lens.

TABLE 9

Example 3 - Lens Data

| Surface No. | Radius of Curvature | Surface Distance | nd | νd | θg, F |
|---|---|---|---|---|---|
| 1 | 3401.6455 | 4.4000 | 1.83400 | 37.16 | 0.57759 |
| 2 | 351.0096 | 1.8868 | | | |
| 3 | 342.2938 | 25.8399 | 1.43387 | 95.20 | 0.53733 |
| 4 | −617.1126 | 27.5208 | | | |
| 5 | 376.1863 | 18.8689 | 1.43387 | 95.20 | 0.53733 |
| 6 | −1480.7062 | 0.1200 | | | |
| 7 | 231.2856 | 19.2460 | 1.43387 | 95.20 | 0.53733 |
| 8 | 989.5463 | 2.0149 | | | |
| 9 | 197.6466 | 13.4721 | 1.49700 | 81.54 | 0.53748 |
| 10 | 375.6095 | DD[10] | | | |
| *11 | ∞ | 3.0000 | 2.00069 | 25.46 | 0.61364 |
| 12 | 117.2892 | 4.6982 | | | |
| 13 | −94.1530 | 1.7000 | 2.00100 | 29.13 | 0.59952 |
| 14 | 62.7238 | 6.3333 | | | |
| 15 | −68.8577 | 1.7000 | 2.00100 | 29.13 | 0.59952 |
| 16 | 82.7458 | 7.1864 | 1.80809 | 22.76 | 0.63073 |
| 17 | −83.6047 | 0.1200 | | | |
| 18 | 203.1800 | 11.2541 | 1.80809 | 22.76 | 0.63073 |

TABLE 9-continued

Example 3 - Lens Data

| Surface No. | Radius of Curvature | Surface Distance | nd | vd | θg, F |
|---|---|---|---|---|---|
| 19 | −36.9251 | 1.7000 | 1.81600 | 46.62 | 0.55682 |
| 20 | 1365.5915 | DD[20] | | | |
| 21 | 241.0954 | 7.8946 | 1.59282 | 68.63 | 0.54414 |
| *22 | −241.6904 | DD[22] | | | |
| 23 | 103.8609 | 15.7378 | 1.43875 | 94.93 | 0.53433 |
| 24 | −143.9534 | 2.0000 | 1.59270 | 35.31 | 0.59336 |
| 25 | −204.8217 | 0.1201 | | | |
| *26 | 288.8799 | 5.1397 | 1.43875 | 94.93 | 0.53433 |
| 27 | −602.9309 | 0.1200 | | | |
| 28 | 148.1149 | 2.0000 | 1.71736 | 29.52 | 0.60483 |
| 29 | 61.8772 | 14.4753 | 1.43875 | 94.93 | 0.53433 |
| 30 | −435.0225 | DD[30] | | | |
| 31 (stop) | ∞ | 5.1564 | | | |
| 32 | −110.6957 | 1.5000 | 1.77250 | 49.60 | 0.55212 |
| 33 | 56.7314 | 0.1198 | | | |
| 34 | 44.3333 | 4.8711 | 1.80518 | 25.42 | 0.61616 |
| 35 | 303.5707 | 1.8584 | | | |
| 36 | −109.1693 | 1.5000 | 1.48749 | 70.23 | 0.53007 |
| 37 | 112.1803 | 7.6633 | | | |
| 38 | −86.9018 | 1.8000 | 1.80400 | 46.58 | 0.55730 |
| 39 | 53.6132 | 6.4361 | 1.80518 | 25.43 | 0.61027 |
| 40 | −72.8379 | 1.2686 | | | |
| 41 | −46.5273 | 3.3491 | 2.00069 | 25.46 | 0.61364 |
| 42 | 801.7665 | 6.5335 | 1.51633 | 64.14 | 0.53531 |
| 43 | −41.5451 | 0.1200 | | | |
| 44 | −624.9701 | 16.7392 | 1.59270 | 35.31 | 0.59336 |
| 45 | −160.0078 | 7.1806 | | | |
| 46 | −556.3538 | 4.1093 | 1.76182 | 26.52 | 0.61361 |
| 47 | −78.7616 | 0.1250 | | | |
| 48 | 281.5288 | 4.7676 | 1.88300 | 40.76 | 0.56679 |
| 49 | 51.2333 | 0.1377 | | | |
| 50 | 46.8988 | 8.1690 | 1.51633 | 64.14 | 0.53531 |
| 51 | −67.6554 | 0.1198 | | | |
| 52 | 65.7102 | 7.2583 | 1.48749 | 70.23 | 0.53007 |
| 53 | −49.7664 | 5.0000 | 2.00100 | 29.13 | 0.59952 |
| 54 | 1098.4109 | 7.7546 | 1.51633 | 64.14 | 0.53531 |
| 55 | −77.0153 | 0.2498 | | | |
| 56 | ∞ | 1.0000 | 1.51633 | 64.14 | 0.53531 |
| 57 | ∞ | 0.0000 | | | |
| 58 | ∞ | 33.0000 | 1.60863 | 46.60 | 0.56787 |
| 59 | ∞ | 13.2000 | 1.51633 | 64.14 | 0.53531 |
| 60 | ∞ | 17.3402 | | | |

TABLE 10

Example 3 - Specifications (d-line)

| | Wide Angle End | Middle | Telephoto End |
|---|---|---|---|
| Zoom Magnification | 1.0 | 48.0 | 103.0 |
| f | 8.69 | 417.11 | 895.06 |
| Bf | 47.47 | 47.47 | 47.47 |
| FNo. | 1.76 | 2.16 | 4.64 |
| 2ω [°] | 69.2 | 1.6 | 0.8 |

TABLE 11

Example 3 - Distances with respect to Zoom

| | Wide Angle End | Middle | Telephoto End |
|---|---|---|---|
| DD[10] | 2.0564 | 178.6194 | 184.7805 |
| DD[20] | 292.3116 | 37.5494 | 2.9266 |
| DD[22] | 1.1659 | 9.3749 | 1.1694 |
| DD[30] | 3.5498 | 73.5399 | 110.2071 |

TABLE 12

Example 3 - Aspheric Coefficients

| | Surface No. | | |
|---|---|---|---|
| | 11 | 22 | 26 |
| KA | 1.0000000E+00 | 1.0000000E+00 | 1.0000000E+00 |
| A4 | 1.5986805E−06 | 6.3959084E−08 | −3.0646162E−07 |
| A6 | 6.2257478E−11 | 3.1977885E−12 | −6.8530435E−12 |
| A8 | −1.1157694E−13 | 6.8145266E−15 | 5.0409987E−15 |
| A10 | 5.4339717E−16 | −2.4409123E−18 | −1.8612932E−18 |

Figure 13:
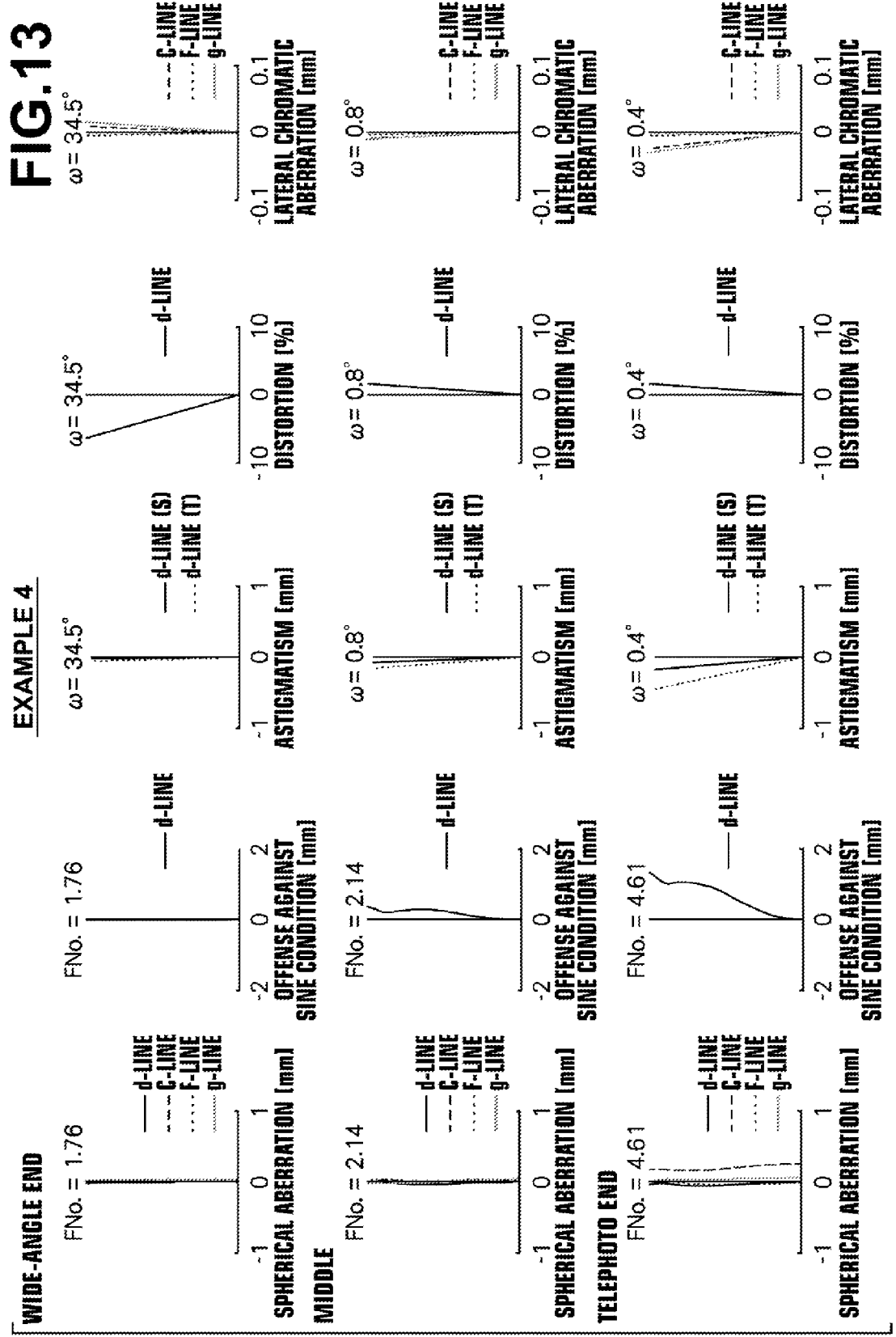
FIG. 13 shows aberration diagrams of the zoom lens of Example 4 of the invention.

Next, a zoom lens of Example 4 is described. FIG. 5 is a sectional view illustrating the lens configuration of the zoom lens of Example 4. The zoom lens of Example 4 is formed by the same number of lenses as the zoom lens of Example 2. Table 13 shows basic lens data of the zoom lens of Example 4, Table 14 shows data about specifications of the zoom lens, Table 15 shows data about surface distances to be changed of the zoom lens, Table 16 shows data about aspheric coefficients of the zoom lens, and FIG. 13 shows aberration diagrams of the zoom lens.

TABLE 13

Example 4 - Lens Data

| Surface No. | Radius of Curvature | Surface Distance | nd | vd | θg, F |
|---|---|---|---|---|---|
| 1 | 1679.1100 | 4.4000 | 1.83400 | 37.34 | 0.57908 |
| 2 | 323.2462 | 2.1707 | | | |
| 3 | 321.3557 | 24.6790 | 1.43387 | 95.20 | 0.53733 |
| 4 | −828.0280 | 27.2490 | | | |
| 5 | 352.4307 | 20.0371 | 1.43387 | 95.20 | 0.53733 |
| 6 | −1393.8728 | 0.1200 | | | |
| 7 | 233.7836 | 19.9742 | 1.43387 | 95.20 | 0.53733 |
| 8 | 1239.6399 | 2.0233 | | | |
| 9 | 191.8374 | 13.2536 | 1.43875 | 94.93 | 0.53433 |
| 10 | 362.1349 | DD[10] | | | |
| *11 | ∞ | 2.8000 | 1.90366 | 31.32 | 0.59481 |
| 12 | 95.4551 | 5.0181 | | | |
| 13 | −102.2722 | 1.7000 | 2.00100 | 29.13 | 0.59952 |
| 14 | 66.9714 | 5.7917 | | | |
| 15 | −84.4146 | 1.7000 | 1.95375 | 32.32 | 0.59015 |
| 16 | 74.4191 | 6.4634 | 1.80809 | 22.76 | 0.63073 |
| 17 | −125.2570 | 0.1200 | | | |
| 18 | 185.4507 | 10.3561 | 1.80809 | 22.76 | 0.63073 |
| 19 | −39.1655 | 1.7000 | 1.81600 | 46.62 | 0.55682 |
| 20 | 741.0835 | DD[20] | | | |
| 21 | 269.0722 | 8.9958 | 1.59282 | 68.63 | 0.54414 |
| *22 | −188.5005 | DD[22] | | | |
| 23 | 116.4083 | 15.0789 | 1.43875 | 94.93 | 0.53433 |
| 24 | −135.1380 | 2.0000 | 1.59270 | 35.31 | 0.59336 |
| 25 | −287.6064 | 0.1200 | | | |
| *26 | 213.3535 | 8.5372 | 1.43875 | 94.93 | 0.53433 |
| 27 | −251.2973 | 0.1200 | | | |
| 28 | 168.6295 | 2.0000 | 1.80000 | 29.84 | 0.60178 |
| 29 | 73.6693 | 12.7294 | 1.43875 | 94.93 | 0.53433 |
| 30 | −428.1421 | DD[30] | | | |
| 31 (stop) | ∞ | 4.9792 | | | |
| 32 | −82.8526 | 1.5000 | 1.77250 | 49.60 | 0.55212 |
| 33 | 60.4349 | 0.1200 | | | |
| 34 | 46.7397 | 4.4559 | 1.80518 | 25.42 | 0.61616 |
| 35 | 239.1245 | 1.7843 | | | |
| 36 | −169.3235 | 1.5000 | 1.48749 | 70.23 | 0.53007 |
| 37 | 124.7963 | 7.3306 | | | |
| 38 | −112.3956 | 1.8000 | 1.80400 | 46.58 | 0.55730 |
| 39 | 68.0092 | 5.6901 | 1.80518 | 25.43 | 0.61027 |
| 40 | −106.0694 | 3.4248 | | | |
| 41 | −46.7496 | 2.0697 | 2.00100 | 29.13 | 0.59952 |
| 42 | 604.2903 | 6.8791 | 1.51823 | 58.90 | 0.54567 |
| 43 | −38.1164 | 0.1200 | | | |

TABLE 13-continued

Example 4 - Lens Data

| Surface No. | Radius of Curvature | Surface Distance | nd | vd | θg, F |
|---|---|---|---|---|---|
| 44 | 343.5738 | 16.1609 | 1.59270 | 35.31 | 0.59336 |
| 45 | −197.5591 | 6.7359 | | | |
| 46 | 731.7887 | 8.0239 | 1.68893 | 31.07 | 0.60041 |
| 47 | −89.4320 | 0.1200 | | | |
| 48 | 167.4929 | 8.6440 | 1.95375 | 32.32 | 0.59015 |
| 49 | 45.9661 | 0.6474 | | | |
| 50 | 44.0296 | 8.5238 | 1.51742 | 52.43 | 0.55649 |
| 51 | −76.8135 | 0.1200 | | | |
| 52 | 78.2551 | 6.9794 | 1.48749 | 70.23 | 0.53007 |
| 53 | −51.5314 | 1.9338 | 2.00100 | 29.13 | 0.59952 |
| 54 | −500.0000 | 3.5006 | 1.51823 | 58.90 | 0.54567 |
| 55 | −82.1615 | 0.2498 | | | |
| 56 | ∞ | 1.0000 | 1.51633 | 64.14 | 0.53531 |
| 57 | ∞ | 0.0000 | | | |
| 58 | ∞ | 33.0000 | 1.60863 | 46.60 | 0.56787 |
| 59 | ∞ | 13.2000 | 1.51633 | 64.14 | 0.53531 |
| 60 | ∞ | 17.8326 | | | |

TABLE 14

Example 4 - Specifications (d-line)

| | Wide Angle End | Middle | Telephoto End |
|---|---|---|---|
| Zoom Magnification | 1.0 | 48.0 | 103.0 |
| f | 8.70 | 417.37 | 895.61 |
| Bf | 47.96 | 47.96 | 47.96 |
| FNo. | 1.76 | 2.14 | 4.61 |
| 2ω [°] | 69.0 | 1.6 | 0.8 |

TABLE 15

Example 4 - Distances with respect to Zoom

| | Wide Angle End | Middle | Telephoto End |
|---|---|---|---|
| DD[10] | 2.1086 | 177.7359 | 184.1690 |
| DD[20] | 291.6237 | 38.6921 | 3.9214 |
| DD[22] | 1.3061 | 7.9976 | 1.2115 |
| DD[30] | 3.4557 | 74.0685 | 109.1921 |

TABLE 16

Example 4 - Aspheric Coefficients

| | Surface No. | | |
|---|---|---|---|
| | 11 | 22 | 26 |
| KA | 1.0000000E+00 | 1.0000000E+00 | 1.0000000E+00 |
| A4 | 1.3194362E−06 | 6.8431721E−08 | −2.8198033E−07 |
| A6 | 1.3317610E−11 | 4.8482742E−12 | −3.5252768E−12 |
| A8 | −8.9925908E−14 | 5.1835631E−15 | 4.8626340E−15 |
| A10 | 3.8898545E−16 | −2.0010737E−18 | −1.7363734E−18 |

Figure 14:
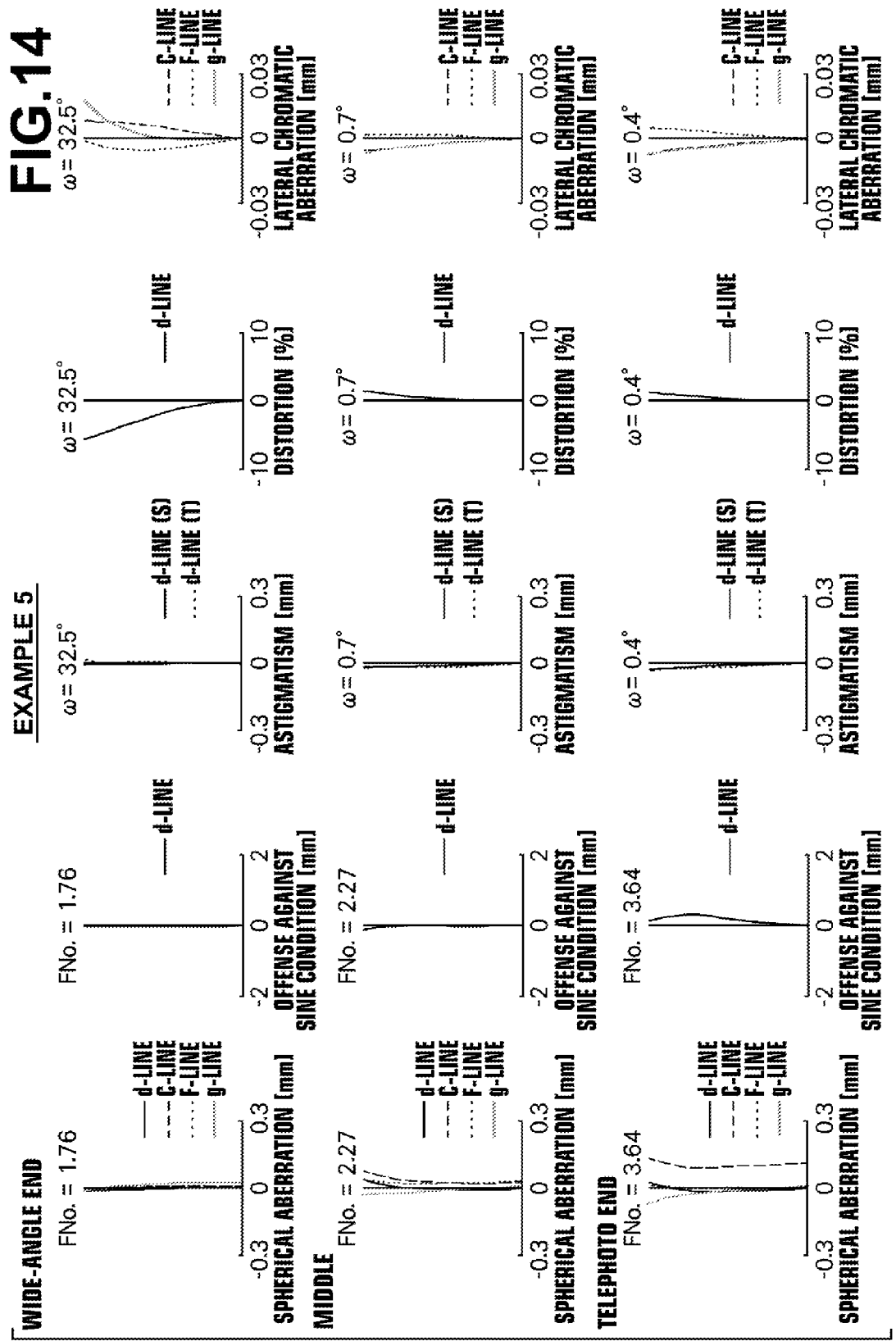
FIG. 14 shows aberration diagrams of the zoom lens of Example 5 of the invention.

Next, a zoom lens of Example 5 is described. FIG. 6 is a sectional view illustrating the lens configuration of the zoom lens of Example 5. The zoom lens of Example 5 differs from the zoom lens of Example 1 in that, in the zoom lens of Example 5, the fourth lens group G4 is formed by five lenses, i.e., lenses L41 to L45. Table 17 shows basic lens data of the zoom lens of Example 5, Table 18 shows data about specifications of the zoom lens, Table 19 shows data about surface distances to be changed of the zoom lens, Table 20 shows data about aspheric coefficients of the zoom lens, and FIG. 14 shows aberration diagrams of the zoom lens.

TABLE 17

Example 5 - Lens Data

| Surface No. | Radius of Curvature | Surface Distance | nd | vd | θg, F |
|---|---|---|---|---|---|
| 1 | 2149.2163 | 4.4000 | 1.83400 | 37.16 | 0.57759 |
| 2 | 364.4008 | 1.8100 | | | |
| 3 | 357.1559 | 24.5800 | 1.43387 | 95.18 | 0.53733 |
| 4 | −629.0299 | 32.8500 | | | |
| 5 | 363.8700 | 15.6200 | 1.43387 | 95.18 | 0.53733 |
| 6 | ∞ | 0.1200 | | | |
| 7 | 310.1672 | 17.8400 | 1.43387 | 95.18 | 0.53733 |
| 8 | ∞ | 2.9000 | | | |
| 9 | 173.0993 | 14.6700 | 1.43875 | 94.94 | 0.53433 |
| 10 | 310.0848 | DD[10] | | | |
| *11 | 109963.7968 | 2.8000 | 1.90366 | 31.31 | 0.59481 |
| 12 | 56.5266 | 8.6300 | | | |
| 13 | −84.6070 | 1.6000 | 2.00100 | 29.13 | 0.59952 |
| 14 | 321.4052 | 6.6700 | | | |
| 15 | −62.2824 | 1.6000 | 1.95375 | 32.32 | 0.59015 |
| 16 | 115.4560 | 6.9400 | 1.89286 | 20.36 | 0.63944 |
| 17 | −73.9497 | 0.1200 | | | |
| 18 | 962.3821 | 7.7100 | 1.80518 | 25.43 | 0.61027 |
| 19 | −51.3780 | 1.6200 | 1.80400 | 46.58 | 0.55730 |
| 20 | 2303.8825 | DD[20] | | | |
| 21 | 170.3657 | 9.7800 | 1.49700 | 81.54 | 0.53748 |
| *22 | −209.1383 | DD[22] | | | |
| 23 | 137.4359 | 11.9100 | 1.43700 | 95.10 | 0.53364 |
| 24 | −175.8090 | 2.0000 | 1.59270 | 35.31 | 0.59336 |
| 25 | −597.2019 | 0.2500 | | | |
| *26 | 188.3526 | 9.3100 | 1.43700 | 95.10 | 0.53364 |
| 27 | −195.4929 | 0.1200 | | | |
| 28 | 247.3158 | 2.0000 | 1.80000 | 29.84 | 0.60178 |
| 29 | 94.0850 | 12.0500 | 1.43700 | 95.10 | 0.53364 |
| 30 | −217.6314 | DD[30] | | | |
| 31 (stop) | ∞ | 5.0700 | | | |
| 32 | −188.3440 | 1.4000 | 1.77250 | 49.60 | 0.55212 |
| 33 | 62.0923 | 0.1200 | | | |
| 34 | 43.4903 | 4.5500 | 1.80518 | 25.42 | 0.61616 |
| 35 | 151.4362 | 2.0300 | | | |
| 36 | −188.3403 | 1.4000 | 1.48749 | 70.24 | 0.53007 |
| 37 | 72.1812 | 9.2600 | | | |
| 38 | −50.3918 | 3.2500 | 1.80440 | 39.59 | 0.57297 |
| 39 | 63.9801 | 8.1300 | 1.80518 | 25.43 | 0.61027 |
| 40 | −46.8126 | 0.3400 | | | |
| 41 | −50.8827 | 1.6600 | 1.95375 | 32.32 | 0.59015 |
| 42 | 56.9580 | 7.3800 | 1.72916 | 54.68 | 0.54451 |
| 43 | −73.6910 | 0.1200 | | | |
| 44 | 215.7126 | 10.9800 | 1.73800 | 32.26 | 0.58995 |
| 45 | −215.7126 | 8.8100 | | | |
| 46 | 182.7540 | 17.0600 | 1.67003 | 47.23 | 0.56276 |
| 47 | −103.9363 | 0.1200 | | | |
| 48 | 148.7010 | 2.9000 | 1.95375 | 32.32 | 0.59015 |
| 49 | 44.8210 | 0.8500 | | | |
| 50 | 44.9406 | 10.1300 | 1.51633 | 64.14 | 0.53531 |
| 51 | −64.7286 | 0.1200 | | | |
| 52 | 65.6410 | 5.1900 | 1.48749 | 70.24 | 0.53007 |
| 53 | −65.6410 | 1.8500 | 1.95375 | 32.32 | 0.59015 |
| 54 | ∞ | 0.2500 | | | |
| 55 | ∞ | 1.0000 | 1.51633 | 64.14 | 0.53531 |
| 56 | ∞ | 0.0000 | | | |
| 57 | ∞ | 33.0000 | 1.60863 | 46.60 | 0.56787 |
| 58 | ∞ | 13.2000 | 1.51633 | 64.14 | 0.53531 |
| 59 | ∞ | 17.3299 | | | |

TABLE 18

Example 5 - Specifications (d-line)

|  | Wide Angle End | Middle | Telephoto End |
|---|---|---|---|
| Zoom Magnification | 1.0 | 48.0 | 77.0 |
| f | 9.30 | 446.26 | 715.88 |
| Bf | 47.46 | 47.46 | 47.46 |
| FNo. | 1.76 | 2.27 | 3.64 |
| 2ω [°] | 65.0 | 1.4 | 0.8 |

TABLE 19

Example 5 - Distances with respect to Zoom

|  | Wide Angle End | Middle | Telephoto End |
|---|---|---|---|
| DD[10] | 2.8554 | 186.6407 | 191.1526 |
| DD[20] | 291.2076 | 26.4986 | 3.9764 |
| DD[22] | 1.4039 | 6.7033 | 1.9940 |
| DD[30] | 3.1233 | 78.7475 | 101.4671 |

TABLE 20

Example 5 - Aspheric Coefficients

| | Surface No. | | |
|---|---|---|---|
|  | 11 | 22 | 26 |
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463314E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Figure 15:
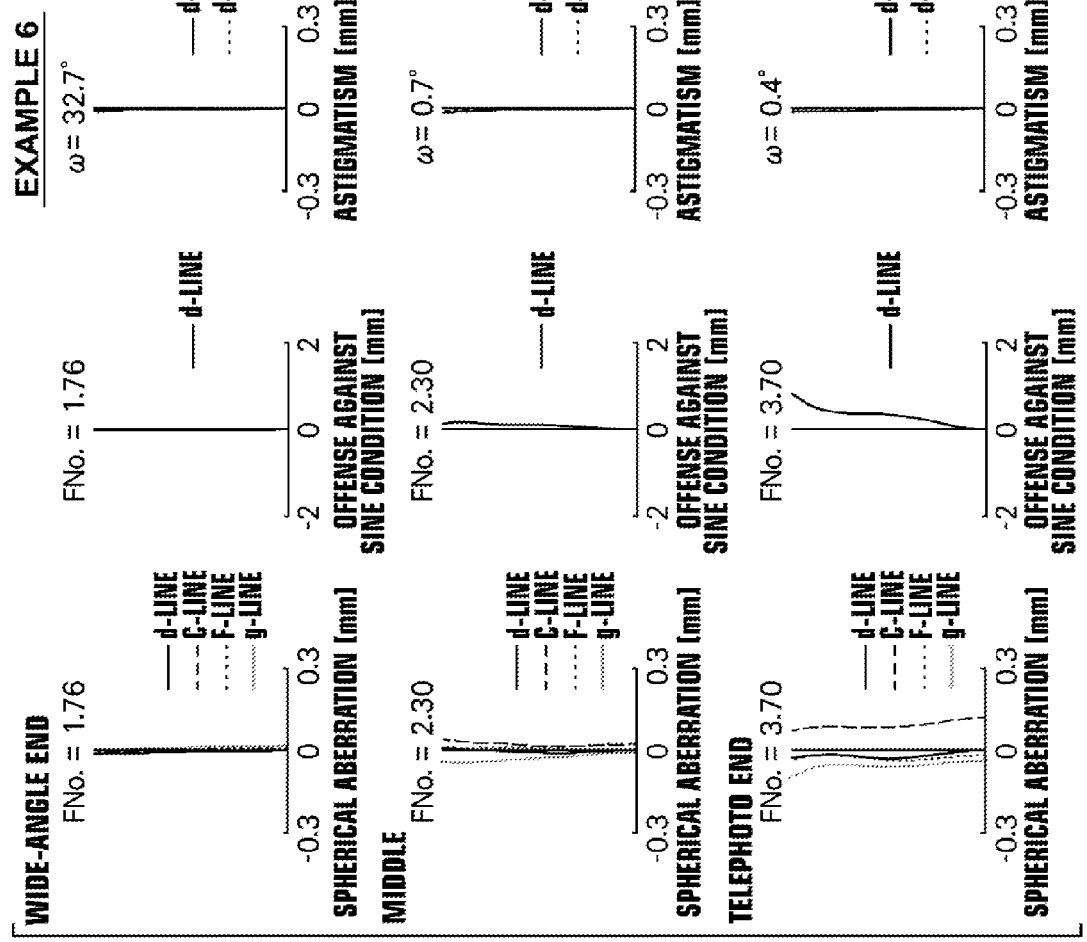
FIG. 15 shows aberration diagrams of the zoom lens of Example 6 of the invention.

Next, a zoom lens of Example 6 is described. FIG. 7 is a sectional view illustrating the lens configuration of the zoom lens of Example 6. The zoom lens of Example 6 is formed by the same number of lenses as the zoom lens of Example 5. Table 21 shows basic lens data of the zoom lens of Example 6, Table 22 shows data about specifications of the zoom lens, Table 23 shows data about surface distances to be changed of the zoom lens, Table 24 shows data about aspheric coefficients of the zoom lens, and FIG. 15 shows aberration diagrams of the zoom lens.

TABLE 21

Example 6 - Lens Data

| Surface No. | Radius of Curvature | Surface Distance | nd | νd | θg, F |
|---|---|---|---|---|---|
| 1 | 3475.3702 | 4.4000 | 1.83400 | 37.16 | 0.57759 |
| 2 | 372.4955 | 5.0357 | | | |
| 3 | 366.9209 | 23.9056 | 1.43387 | 95.18 | 0.53733 |
| 4 | −682.9236 | 32.9837 | | | |
| 5 | 454.1605 | 18.2207 | 1.43387 | 95.18 | 0.53733 |
| 6 | −986.9790 | 0.1100 | | | |
| 7 | 253.2817 | 19.6205 | 1.43387 | 95.18 | 0.53733 |
| 8 | 1947.2332 | 2.0966 | | | |
| 9 | 173.1049 | 13.3055 | 1.43875 | 94.94 | 0.53433 |
| 10 | 292.3182 | DD[10] | | | |
| *11 | 841.9448 | 2.8000 | 1.95375 | 32.32 | 0.59015 |
| 12 | 64.1193 | 5.9910 | | | |
| 13 | −139.9177 | 1.7000 | 2.00100 | 29.13 | 0.59952 |
| 14 | 103.9852 | 6.2479 | | | |

TABLE 21-continued

Example 6 - Lens Data

| Surface No. | Radius of Curvature | Surface Distance | nd | νd | θg, F |
|---|---|---|---|---|---|
| 15 | −79.6795 | 1.7000 | 1.95375 | 32.32 | 0.59015 |
| 16 | 86.5057 | 6.0539 | 1.84666 | 23.83 | 0.61603 |
| 17 | −153.6438 | 0.1200 | | | |
| 18 | 487.2966 | 11.2129 | 1.80809 | 22.76 | 0.63073 |
| 19 | −38.0425 | 1.7000 | 1.81600 | 46.62 | 0.55682 |
| 20 | −403.3473 | DD[20] | | | |
| 21 | 152.9719 | 9.0813 | 1.59282 | 68.62 | 0.54414 |
| *22 | −317.0888 | DD[22] | | | |
| 23 | 126.9262 | 12.2707 | 1.43700 | 95.10 | 0.53364 |
| 24 | −172.5904 | 2.0000 | 1.59270 | 35.31 | 0.59336 |
| 25 | −585.3741 | 0.1200 | | | |
| *26 | 225.1390 | 9.6209 | 1.43700 | 95.10 | 0.53364 |
| 27 | −151.7222 | 0.1200 | | | |
| 28 | 263.3903 | 2.0000 | 1.80000 | 29.84 | 0.60178 |
| 29 | 88.7553 | 11.7320 | 1.43700 | 95.10 | 0.53364 |
| 30 | −232.3846 | DD[30] | | | |
| 31 (stop) | ∞ | 4.1987 | | | |
| 32 | −163.6964 | 1.5000 | 1.78800 | 47.37 | 0.55598 |
| 33 | 66.6579 | 0.1200 | | | |
| 34 | 46.2167 | 4.0850 | 1.76182 | 26.52 | 0.61361 |
| 35 | 152.4046 | 2.8557 | | | |
| 36 | −98.8029 | 1.5000 | 1.48749 | 70.24 | 0.53007 |
| 37 | 67.8883 | 8.2120 | | | |
| 38 | −103.2169 | 1.8000 | 1.83481 | 42.72 | 0.56486 |
| 39 | 62.9851 | 10.1794 | 1.84666 | 23.83 | 0.61603 |
| 40 | −74.4274 | 0.8479 | | | |
| 41 | −63.4207 | 3.4958 | 1.95375 | 32.32 | 0.59015 |
| 42 | 101.4326 | 7.1124 | 1.60311 | 60.64 | 0.54148 |
| 43 | −57.8040 | 0.1200 | | | |
| 44 | 127.8051 | 19.0888 | 1.61772 | 49.81 | 0.56035 |
| 45 | −5769.3694 | 7.1792 | | | |
| 46 | 244.7704 | 5.7290 | 1.58913 | 61.13 | 0.54067 |
| 47 | −108.1583 | 0.1200 | | | |
| 48 | 234.3868 | 7.4062 | 1.95375 | 32.32 | 0.59015 |
| 49 | 50.8661 | 0.7019 | | | |
| 50 | 51.8722 | 7.3813 | 1.58913 | 61.13 | 0.54067 |
| 51 | −74.1423 | 0.1500 | | | |
| 52 | 64.9784 | 5.7488 | 1.48749 | 70.24 | 0.53007 |
| 53 | −92.6312 | 3.8115 | 1.95375 | 32.32 | 0.59015 |
| 54 | −6201.4507 | 0.2500 | | | |
| 55 | ∞ | 1.0000 | 1.51633 | 64.14 | 0.53531 |
| 56 | ∞ | 0.0000 | | | |
| 57 | ∞ | 33.0000 | 1.60863 | 46.60 | 0.56787 |
| 58 | ∞ | 13.2000 | 1.51633 | 64.14 | 0.53531 |
| 59 | ∞ | 17.5370 | | | |

TABLE 22

Example 6 - Specifications (d-line)

|  | Wide Angle End | Middle | Telephoto End |
|---|---|---|---|
| Zoom Magnification | 1.0 | 48.0 | 77.0 |
| f | 9.27 | 444.91 | 713.71 |
| Bf | 47.67 | 47.67 | 47.67 |
| FNo. | 1.76 | 2.30 | 3.70 |
| 2ω [°] | 65.4 | 1.4 | 0.8 |

TABLE 23

Example 6 - Distances with respect to Zoom

|  | Wide Angle End | Middle | Telephoto End |
|---|---|---|---|
| DD[10] | 2.5512 | 185.1434 | 189.5366 |
| DD[20] | 280.2287 | 26.2040 | 3.9658 |
| DD[22] | 8.3473 | 5.5415 | 1.2476 |
| DD[30] | 2.3437 | 76.5819 | 98.7208 |

TABLE 24

Example 6 - Aspheric Coefficients

| | Surface No. | | |
|---|---|---|---|
| | 11 | 22 | 26 |
| KA | 1.0000000E+00 | 1.0000000E+00 | 1.0000000E+00 |
| A4 | 2.7395225E−07 | 1.1987876E−07 | −4.8883780E−07 |
| A6 | −4.8949478E−11 | 2.4237606E−11 | 2.3182674E−11 |
| A8 | 1.8491556E−13 | −2.9894229E−15 | −3.2052197E−15 |
| A10 | −1.9679971E−16 | −3.3833557E−19 | 9.7256769E−20 |

Figure 16:
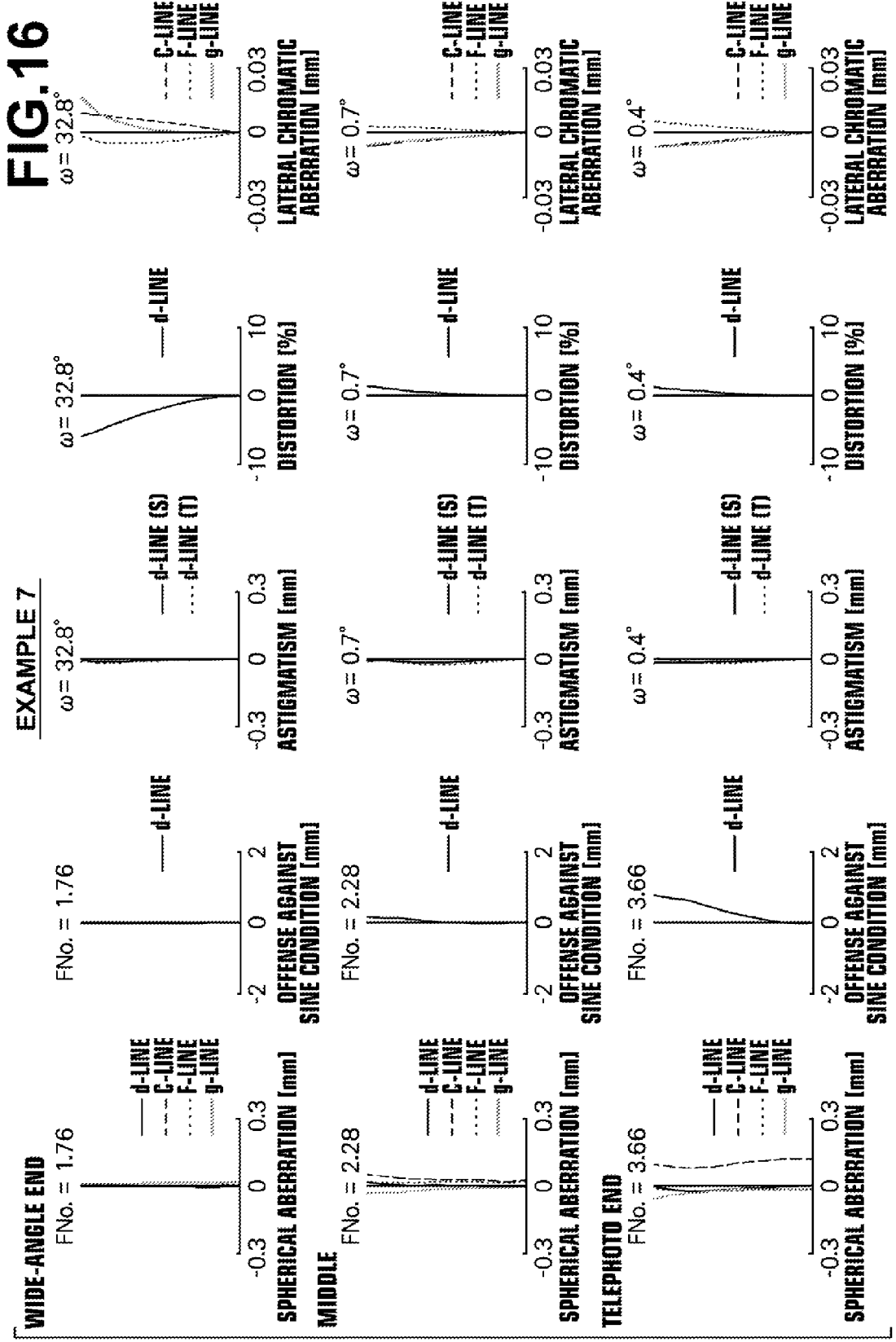
FIG. 16 shows aberration diagrams of the zoom lens of Example 7 of the invention.

Next, a zoom lens of Example 7 is described. FIG. 8 is a sectional view illustrating the lens configuration of the zoom lens of Example 7. The zoom lens of Example 7 is formed by the same number of lenses as the zoom lens of Example 5. Table 25 shows basic lens data of the zoom lens of Example 7, Table 26 shows data about specifications of the zoom lens, Table 27 shows data about surface distances to be changed of the zoom lens, Table 28 shows data about aspheric coefficients of the zoom lens, and FIG. 16 shows aberration diagrams of the zoom lens.

TABLE 25

Example 7 - Lens Data

| Surface No. | Radius of Curvature | Surface Distance | nd | vd | θg, F |
|---|---|---|---|---|---|
| 1 | 3055.3747 | 4.4000 | 1.83400 | 37.16 | 0.57759 |
| 2 | 372.1635 | 1.9397 | | | |
| 3 | 366.5958 | 22.9318 | 1.43387 | 95.18 | 0.53733 |
| 4 | −745.5153 | 30.9741 | | | |
| 5 | 447.2910 | 17.8731 | 1.43387 | 95.18 | 0.53733 |
| 6 | −1022.1176 | 0.1202 | | | |
| 7 | 250.7002 | 20.0594 | 1.43387 | 95.18 | 0.53733 |
| 8 | 2497.1844 | 2.0893 | | | |
| 9 | 173.5560 | 13.5554 | 1.43875 | 94.94 | 0.53433 |
| 10 | 296.5606 | DD[10] | | | |
| *11 | −536.2036 | 2.8000 | 1.90366 | 31.31 | 0.59481 |
| 12 | 59.0403 | 11.2534 | | | |
| 13 | −94.9158 | 1.7000 | 2.00100 | 29.13 | 0.59952 |
| 14 | 266.5653 | 4.8654 | | | |
| 15 | −73.3496 | 1.7000 | 1.95375 | 32.32 | 0.59015 |
| 16 | 114.5658 | 6.3833 | 1.89286 | 20.36 | 0.63944 |
| 17 | −87.7169 | 0.1202 | | | |
| 18 | 660.4559 | 10.0644 | 1.80518 | 25.43 | 0.61027 |
| 19 | −42.5900 | 1.7000 | 1.81600 | 46.62 | 0.55682 |
| 20 | 2697.8154 | DD[20] | | | |
| 21 | 163.2078 | 9.6780 | 1.53775 | 74.70 | 0.53936 |
| *22 | −262.8890 | DD[22] | | | |
| 23 | 161.2674 | 13.7150 | 1.43700 | 95.10 | 0.53364 |
| 24 | −135.7995 | 2.0000 | 1.59270 | 35.31 | 0.59336 |
| 25 | −425.7431 | 0.2500 | | | |
| *26 | 165.9002 | 10.7003 | 1.43700 | 95.10 | 0.53364 |
| 27 | −172.4386 | 0.1734 | | | |
| 28 | 209.1264 | 2.0000 | 1.80000 | 29.84 | 0.60178 |
| 29 | 88.7369 | 11.9532 | 1.43700 | 95.10 | 0.53364 |
| 30 | −285.7611 | DD[30] | | | |
| 31 (stop) | ∞ | 4.8788 | | | |
| 32 | −183.6883 | 1.5000 | 1.72916 | 54.68 | 0.54451 |
| 33 | 65.0566 | 0.1200 | | | |
| 34 | 46.1588 | 3.1785 | 1.89286 | 20.36 | 0.63944 |
| 35 | 74.9110 | 3.4315 | | | |
| 36 | −155.5064 | 1.5000 | 1.48749 | 70.24 | 0.53007 |
| 37 | 286.4381 | 10.8498 | | | |
| 38 | −46.9919 | 1.8000 | 1.95375 | 32.32 | 0.59015 |
| 39 | 54.2501 | 7.9488 | 1.84666 | 23.83 | 0.61603 |
| 40 | −45.8449 | 0.2577 | | | |
| 41 | −49.2346 | 1.8305 | 1.80100 | 34.97 | 0.58642 |
| 42 | 45.4781 | 8.0001 | 1.80400 | 46.58 | 0.55730 |
| 43 | −89.8875 | 0.1849 | | | |
| 44 | 377.4389 | 4.9915 | 1.57135 | 52.95 | 0.55544 |
| 45 | −154.4243 | 14.2327 | | | |
| 46 | 186.3239 | 4.9508 | 1.58267 | 46.42 | 0.56716 |

TABLE 25-continued

Example 7 - Lens Data

| Surface No. | Radius of Curvature | Surface Distance | nd | vd | θg, F |
|---|---|---|---|---|---|
| 47 | −95.3723 | 5.4549 | | | |
| 48 | 144.8648 | 1.8002 | 1.95375 | 32.32 | 0.59015 |
| 49 | 45.1508 | 0.3951 | | | |
| 50 | 44.2996 | 8.0066 | 1.51633 | 64.14 | 0.53531 |
| 51 | −70.4722 | 0.1425 | | | |
| 52 | 65.0540 | 6.2761 | 1.48749 | 70.24 | 0.53007 |
| 53 | −59.8318 | 1.8002 | 1.95375 | 32.32 | 0.59015 |
| 54 | −463.5944 | 0.2500 | | | |
| 55 | ∞ | 1.0000 | 1.51633 | 64.14 | 0.53531 |
| 56 | ∞ | 0.0000 | | | |
| 57 | ∞ | 33.0000 | 1.60863 | 46.60 | 0.56787 |
| 58 | ∞ | 13.2000 | 1.51633 | 64.14 | 0.53531 |
| 59 | ∞ | 17.3431 | | | |

TABLE 26

Example 7 - Specifications (d-line)

| | Wide Angle End | Middle | Telephoto End |
|---|---|---|---|
| Zoom Magnification | 1.0 | 48.0 | 77.0 |
| f | 9.23 | 443.00 | 710.64 |
| Bf | 47.47 | 47.47 | 47.47 |
| FNo. | 1.76 | 2.28 | 3.66 |
| 2ω [°] | 65.6 | 1.4 | 0.8 |

TABLE 27

Example 7 - Distances with respect to Zoom

| | Wide Angle End | Middle | Telephoto End |
|---|---|---|---|
| DD[10] | 3.4238 | 181.0344 | 185.5983 |
| DD[20] | 284.5381 | 25.8471 | 3.9765 |
| DD[22] | 1.2485 | 5.8275 | 1.4969 |
| DD[30] | 2.6912 | 79.1928 | 100.8300 |

TABLE 28

Example 7 - Aspheric Coefficients

| | Surface No. | | |
|---|---|---|---|
| | 11 | 22 | 26 |
| KA | 1.0000000E+00 | 1.0000000E+00 | 1.0000000E+00 |
| A3 | −1.8734223E−21 | −9.4994419E−23 | −1.9744504E−22 |
| A4 | 4.0377651E−07 | 2.5885178E−08 | −3.7276810E−07 |
| A5 | 2.8838804E−08 | 8.1208148E−09 | −7.1416960E−09 |
| A6 | −2.3778998E−09 | −4.4404402E−10 | 6.1323910E−10 |
| A7 | −1.3752036E−10 | −1.1642324E−11 | −4.5003167E−12 |
| A8 | 3.3235604E−11 | 2.2808889E−12 | −1.8306327E−12 |
| A9 | −1.1806499E−12 | −3.8082037E−14 | 7.2409382E−14 |
| A10 | −1.1119723E−13 | −4.3094590E−15 | 1.7877810E−15 |
| A11 | 8.8174734E−15 | 1.5931457E−16 | −1.4970490E−16 |
| A12 | 9.1414991E−17 | 3.2617744E−18 | 4.0269046E−19 |
| A13 | −2.4438511E−17 | −2.2129774E−19 | 1.3563698E−19 |
| A14 | 2.8333842E−19 | −9.8414232E−23 | −1.9299794E−21 |
| A15 | 3.4151692E−20 | 1.4709791E−22 | −5.7156780E−23 |
| A16 | −7.6652516E−22 | −1.2247393E−24 | 1.3194211E−24 |
| A17 | −2.3926906E−23 | −4.6409036E−26 | 8.4439905E−27 |
| A18 | 7.0330122E−25 | 6.1748066E−28 | −3.3787964E−28 |
| A19 | 6.6810099E−27 | 5.3374486E−30 | 3.6923088E−31 |
| A20 | −2.3184109E−28 | −8.8908536E−32 | 2.2335912E−32 |

Figure 17:
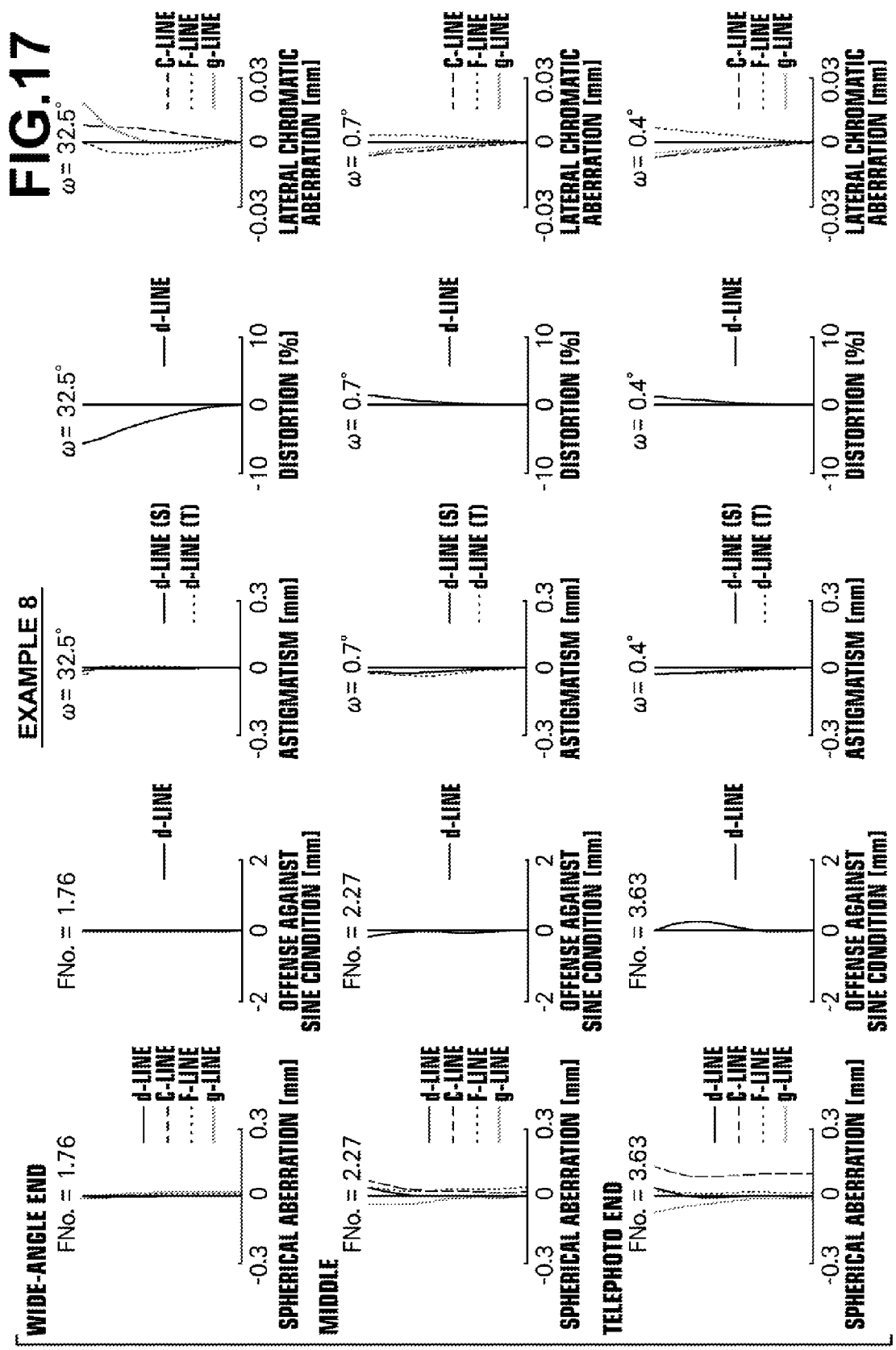
FIG. 17 shows aberration diagrams of the zoom lens of Example 8 of the invention.

Next, a zoom lens of Example 8 is described. FIG. 9 is a sectional view illustrating the lens configuration of the zoom lens of Example 8. The zoom lens of Example 8 is formed by the same number of lenses as the zoom lens of Example 5. Table 29 shows basic lens data of the zoom lens of Example 8, Table 30 shows data about specifications of the zoom lens, Table 31 shows data about surface distances to be changed of the zoom lens, Table 32 shows data about aspheric coefficients of the zoom lens, and FIG. 17 shows aberration diagrams of the zoom lens.

TABLE 29

Example 8 - Lens Data

| Surface No. | Radius of Curvature | Surface Distance | nd | vd | θg, F |
|---|---|---|---|---|---|
| 1 | 1404.7647 | 4.4000 | 1.83400 | 37.16 | 0.57759 |
| 2 | 331.7428 | 2.0290 | | | |
| 3 | 330.6824 | 25.1725 | 1.43387 | 95.18 | 0.53733 |
| 4 | −684.6165 | 32.8963 | | | |
| 5 | 332.8725 | 15.4555 | 1.43387 | 95.18 | 0.53733 |
| 6 | 3192.0621 | 0.1200 | | | |
| 7 | 330.0570 | 18.0043 | 1.43387 | 95.18 | 0.53733 |
| 8 | −4225.7159 | 2.9113 | | | |
| 9 | 173.7787 | 13.4351 | 1.43875 | 94.66 | 0.53402 |
| 10 | 294.8116 | DD[10] | | | |
| *11 | 3646.4256 | 2.8000 | 1.91082 | 35.25 | 0.58224 |
| 12 | 54.3093 | 7.3207 | | | |
| 13 | −83.4371 | 1.6000 | 2.00100 | 29.13 | 0.59952 |
| 14 | 337.9217 | 4.5408 | | | |
| 15 | −62.1882 | 1.6000 | 1.95375 | 32.32 | 0.59015 |
| 16 | 128.3598 | 6.5865 | 1.89286 | 20.36 | 0.63944 |
| 17 | −75.9599 | 0.1200 | | | |
| 18 | 629.8856 | 9.4791 | 1.79504 | 28.69 | 0.60656 |
| 19 | −42.5230 | 1.6200 | 1.77250 | 49.60 | 0.55212 |
| 20 | 2233.5230 | DD[20] | | | |
| 21 | 185.1580 | 9.3099 | 1.49700 | 81.54 | 0.53748 |
| *22 | −216.7260 | DD[22] | | | |
| 23 | 135.0164 | 14.0074 | 1.43875 | 94.66 | 0.53402 |
| 24 | −170.1053 | 2.0000 | 1.59270 | 35.31 | 0.59336 |
| 25 | −547.0734 | 0.2500 | | | |
| *26 | 212.2662 | 8.7456 | 1.43875 | 94.66 | 0.53402 |
| 27 | −201.9044 | 0.1200 | | | |
| 28 | 255.6587 | 2.0000 | 1.80000 | 29.84 | 0.60178 |
| 29 | 100.2233 | 14.6056 | 1.43875 | 94.66 | 0.53402 |
| 30 | −192.7222 | DD[30] | | | |
| 31 (stop) | ∞ | 4.4530 | | | |
| 32 | −327.4803 | 1.5000 | 1.72916 | 54.68 | 0.54451 |
| 33 | 69.9336 | 0.1200 | | | |
| 34 | 45.9379 | 5.2438 | 1.84661 | 23.88 | 0.62072 |
| 35 | 80.2736 | 3.2540 | | | |
| 36 | −136.5718 | 1.5000 | 1.48749 | 70.24 | 0.53007 |
| 37 | 172.9017 | 9.6930 | | | |
| 38 | −48.1573 | 1.5996 | 1.95375 | 32.32 | 0.59015 |
| 39 | 64.0378 | 7.9580 | 1.84661 | 23.88 | 0.62072 |
| 40 | −45.9067 | 0.2385 | | | |
| 41 | −49.7226 | 1.8719 | 1.80100 | 34.97 | 0.58642 |
| 42 | 50.1721 | 8.9651 | 1.80400 | 46.58 | 0.55730 |
| 43 | −90.0272 | 0.1198 | | | |
| 44 | 379.5125 | 11.4833 | 1.51742 | 52.43 | 0.55649 |
| 45 | −145.3944 | 6.4985 | | | |
| 46 | 185.6172 | 4.7307 | 1.54814 | 45.78 | 0.56859 |
| 47 | −90.8051 | 5.4933 | | | |
| 48 | 144.8094 | 1.4061 | 1.95375 | 32.32 | 0.59015 |
| 49 | 44.8523 | 2.4761 | | | |
| 50 | 45.7750 | 6.4411 | 1.51633 | 64.14 | 0.53531 |
| 51 | −73.1882 | 0.1199 | | | |
| 52 | 61.3330 | 5.4690 | 1.48749 | 70.24 | 0.53007 |
| 53 | −58.5284 | 1.3999 | 1.95375 | 32.32 | 0.59015 |
| 54 | −429.0874 | 0.2500 | | | |
| 55 | ∞ | 1.0000 | 1.51633 | 64.14 | 0.53531 |
| 56 | ∞ | 0.0000 | | | |
| 57 | ∞ | 33.0000 | 1.60863 | 46.60 | 0.56787 |
| 58 | ∞ | 13.2000 | 1.51633 | 64.14 | 0.53531 |
| 59 | ∞ | 13.9324 | | | |

TABLE 30

Example 8 - Specifications (d-line)

| | Wide Angle End | Middle | Telephoto End |
|---|---|---|---|
| Zoom Magnification | 1.0 | 48.0 | 77.0 |
| f' | 9.30 | 446.43 | 716.14 |
| Bf' | 44.06 | 44.06 | 44.06 |
| FNo. | 1.76 | 2.27 | 3.63 |
| 2ω [°] | 65.0 | 1.4 | 0.8 |

TABLE 31

Example 8 - Distances with respect to Zoom

| | Wide Angle End | Middle | Telephoto End |
|---|---|---|---|
| DD[10] | 4.1494 | 191.9872 | 196.6227 |
| DD[20] | 296.5791 | 26.5197 | 3.9711 |
| DD[22] | 1.5430 | 6.4538 | 1.2477 |
| DD[30] | 2.3959 | 79.7067 | 102.8260 |

TABLE 32

Example 8 - Aspheric Coefficients

| | Surface No. | | |
|---|---|---|---|
| | 11 | 22 | 26 |
| KA | 1.0000000E+00 | 1.0000000E+00 | 1.0000000E+00 |
| A3 | 2.7541588E−22 | −8.9652271E−22 | 6.6507804E−22 |
| A4 | 2.2200270E−07 | 1.5442509E−07 | −2.6398668E−07 |
| A5 | 3.6655960E−09 | −5.7414857E−09 | −1.0060099E−08 |
| A6 | 3.5909489E−11 | 1.4641121E−10 | 3.5807861E−10 |
| A7 | −1.9924682E−11 | 1.9156089E−12 | −2.2883080E−12 |
| A8 | 7.9185956E−13 | −9.8085610E−14 | −1.3269105E−13 |
| A9 | −5.7638394E−15 | 5.8482396E−16 | 2.9778250E−15 |
| A10 | −1.5115490E−16 | 5.8511099E−18 | −1.8171297E−17 |

Table 33 shows values corresponding to the condition expressions (1) to (5) of the zoom lenses of Examples 1 to 8. In all the examples, the d-line is used as a reference wavelength, and the values shown in Table 33 below are with respect to the reference wavelength.

TABLE 33

| No. | Condition Expression | Example 1 | Example 2 | Example 3 | Example 4 |
|---|---|---|---|---|---|
| (1) | LABnd | 1.95375 | 1.95591 | 1.94200 | 1.97738 |
| (2) | LAnd − LCnd | 0.46626 | 0.48277 | 0.48467 | 0.48277 |
| (3) | LABvd | 32.32 | 32.19 | 34.95 | 30.73 |
| (4) | L23vd − L24vd | 14.61 | 9.56 | 6.37 | 9.56 |
| | L26vd − L25vd | 23.86 | 23.86 | 23.86 | 23.86 |
| (5) | vd21 | 31.32 | 31.32 | 25.46 | 31.32 |

| No. | Condition Expression | Example 5 | Example 6 | Example 7 | Example 8 |
|---|---|---|---|---|---|
| (1) | LABnd | 1.95375 | 1.95375 | 1.95375 | 1.95375 |
| (2) | LAnd − LCnd | 0.46626 | 0.46626 | 0.46626 | 0.46626 |
| (3) | LABvd | 32.32 | 32.32 | 32.32 | 32.32 |
| (4) | L23vd − L24vd | 11.96 | 8.49 | 11.96 | 11.96 |
| | L26vd − L25vd | 21.15 | 23.86 | 21.19 | 20.91 |
| (5) | vd21 | 31.31 | 32.32 | 31.31 | 35.25 |

As can be seen from the above-described data, all the zoom lenses of Examples 1 to 8 satisfy the condition expressions (1) to (5), and have high optical performance, a high magnification of 77× or more, and a wide angle of view with a total angle of view of at least 65° at the wide-angle end.

Figure 18:
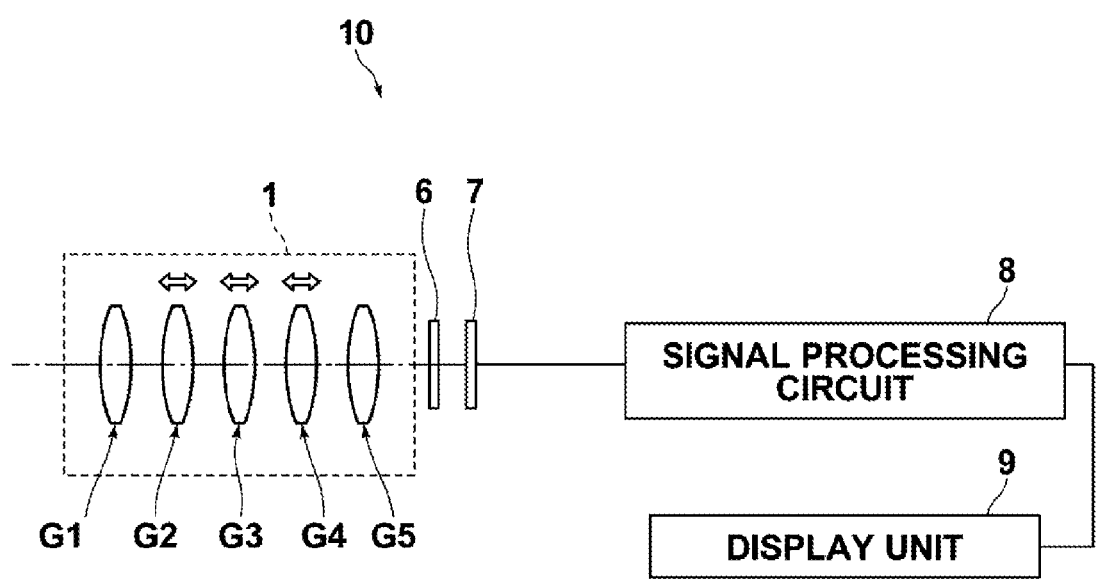
FIG. 18 is a diagram illustrating the schematic configuration of an imaging apparatus according to an embodiment of the invention.

Next, an imaging apparatus according to an embodiment of the invention is described. FIG. 18 is a diagram illustrating the schematic configuration of an imaging apparatus employing the zoom lens of the embodiment of the invention, which is one example of the imaging apparatus of the embodiment of the invention. It should be noted that the lens groups are schematically shown in FIG. 18. Examples of the imaging apparatus may include a video camera and an electronic still camera which include a solid-state image sensor, such as a CCD (Charge Coupled Device) or CMOS (Complementary Metal Oxide Semiconductor), serving as a recording medium.

The imaging apparatus 10 shown in FIG. 18 includes a zoom lens 1; a filter 6 having a function of a low-pass filter, etc., disposed on the image plane side of the zoom lens 1; an image sensor 7 disposed on the image plane side of the filter 6; and a signal processing circuit 8. The image sensor 7 converts an optical image formed by the zoom lens 1 into an electric signal. As the image sensor 7, a CCD or a CMOS, for example, may be used. The image sensor 7 is disposed such that the imaging surface thereof is positioned in the same position as the image plane of the zoom lens 1.

An image taken through the zoom lens 1 is formed on the imaging surface of the image sensor 7. Then, a signal about the image outputted from the image sensor 7 is processed by the signal processing circuit 8, and the image is displayed on a display unit 9.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, etc., of each lens element are not limited to the values shown in the above-described numerical examples and may take different values.

What is claimed is:

1. A zoom lens consisting of, in order from an object side, a first lens group having a positive refractive power, a second lens group having a negative refractive power, a third lens group having a positive refractive power, a fourth lens group having a positive refractive power, and a fifth lens group having a positive refractive power,
wherein, during magnification change, the first lens group and the fifth lens group are fixed relative to an image plane, and the second lens group, the third lens group, and the fourth lens group are moved to change distances therebetween,
during magnification change from a wide-angle end to a telephoto end, the second lens group is moved from the object side toward the image plane side, and the fourth lens group is moved from the image plane side toward the object side,
the fifth lens group comprises at least two negative lenses, and
the condition expression (1) below is satisfied:

$$1.90 < LABnd \quad (1),$$

where LABnd is an average value of a refractive index LAnd with respect to the d-line of an LA negative lens, which is the first negative lens from the image plane side of the fifth lens group, and a refractive index LBnd with respect to the d-line of an LB negative lens, which is the second negative lens from the image plane side of the fifth lens group.

2. The zoom lens as claimed in claim 1, wherein the condition expression (2) below is satisfied:

$$0.42 < LAnd - LCnd \quad (2),$$

where LCnd is a refractive index with respect to the d-line of an LC positive lens, which is the first positive lens from the image plane side of the fifth lens group.

3. The zoom lens as claimed in claim 1, wherein the condition expression (3) below is satisfied:

$$25 < LABvd < 40 \quad (3),$$

where LABvd is an average value of an Abbe number LAvd with respect to the d-line of the LA negative lens and an Abbe number LBvd with respect to the d-line of the LB negative lens.

4. The zoom lens as claimed in claim 1, wherein the second lens group consists of, in order from the object side, an L21 negative lens, an L22 negative lens, a cemented lens formed by an L23 negative lens having a biconcave shape and an L24 positive lens which are cemented together in this order from the object side, a cemented lens formed by an L25 positive lens with a convex surface toward the image plane side and an L26 negative lens with a concave surface toward the object side which are cemented together in this order from the object side.

5. The zoom lens as claimed in claim 4, wherein the condition expression (4) below is satisfied:

$$L23vd - L24vd < L26vd - L25vd \quad (4),$$

where L23vd is an Abbe number with respect to the d-line of the L23 negative lens, L24vd is an Abbe number with respect to the d-line of the L24 positive lens, L26vd is an Abbe number with respect to the d-line of the L26 negative lens, and L25vd is an Abbe number with respect to the d-line of the L25 positive lens.

6. The zoom lens as claimed in claim 1, wherein the first lens group consists of, in order from the object side, an L11 negative lens, an L12 positive lens, an L13 positive lens, an L14 positive lens, and an L15 positive lens.

7. The zoom lens as claimed in claim 1, wherein an L21 negative lens, which is the most object-side negative lens of the second lens group, satisfies the condition expression (5) below:

$$25 < vd21 < 45 \quad (5),$$

where vd21 is an Abbe number with respect to the d-line of the L21 negative lens.

8. The zoom lens as claimed in claim 1, wherein the condition expression (1-1) below is satisfied:

$$1.94 < LABnd \quad (1-1).$$

9. The zoom lens as claimed in claim 2, wherein the condition expression (2-1) below is satisfied:

$$0.45 < LAnd - LCnd \quad (2-1).$$

10. The zoom lens as claimed in claim 3, wherein the condition expression (3-1) below is satisfied:

$$30 < LABvd < 36 \quad (3-1).$$

11. The zoom lens as claimed in claim 7, wherein the condition expression (5-1) below is satisfied:

$$28 < vd21 < 40 \quad (5-1).$$

12. An imaging apparatus comprising the zoom lens as claimed in claim 1.

* * * * *